(12) United States Patent
Closset et al.

(10) Patent No.: US 8,165,170 B2
(45) Date of Patent: Apr. 24, 2012

(54) METHOD FOR ACCESSING A MEDIUM IN A SYNCHRONOUS COMMUNICATIONS NETWORK BY A TRANSMIT NODE, COMPUTER PROGRAM PRODUCT, STORAGE MEANS AND TRANSMIT NODE

(75) Inventors: Arnaud Closset, Cesson Sevigne (FR); Yacine El Kolli, Rennes (FR); Laurent Frouin, Rennes (FR); Pierre Visa, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 661 days.

(21) Appl. No.: 12/351,248

(22) Filed: Jan. 9, 2009

(65) Prior Publication Data

US 2009/0180465 A1    Jul. 16, 2009

(30) Foreign Application Priority Data

Jan. 10, 2008  (FR) ...................................... 08 50126

(51) Int. Cl.
*H04J 3/06*    (2006.01)
(52) U.S. Cl. ........................................ 370/503; 370/350
(58) Field of Classification Search ................... 370/503, 370/350, 345, 347, 348, 349, 498, 508, 510
See application file for complete search history.

(56) References Cited

U.S. PATENT DOCUMENTS

| 6,442,403 | B1 | 8/2002 | Becot et al. ................... 455/556 |
| 7,177,307 | B2 | 2/2007 | Frouin et al. .................. 370/362 |
| 7,269,137 | B2 | 9/2007 | Bizet et al. ................. 370/230.1 |
| 2004/0090983 | A1* | 5/2004 | Gehring et al. ............... 370/458 |
| 2009/0092151 | A1* | 4/2009 | Raguet et al. ................. 370/468 |

OTHER PUBLICATIONS

U.S. Appl. No. 12/437,454, filed May 7, 2009, Inventor: El Kolli, et al.
U.S. Appl. No. 12/351,278, filed Jan. 9, 2009, Inventor: Closset, et al.

* cited by examiner

*Primary Examiner* — Huy Vu
*Assistant Examiner* — Dady Chery
(74) *Attorney, Agent, or Firm* — Fitzpatrick, Cella, Harper & Scinto

(57) ABSTRACT

A transmit mode performs indirect synchronization with a master node for accessing a medium, in a synchronous communications network comprising a plurality of slave nodes capable of accessing the medium during access time slots. The indirect synchronization includes receiving at least one frame coming from at least one of the slave nodes of the network. From each frame received, synchronization information pertaining to a level of synchronization of the slave node having sent the frame is obtained, the level of synchronization of the slave node being relative to the master node. A reference node is selected from among the at least one of the slave nodes from which at least one frame has been received, as a function of the pieces of synchronization information, the transmit node being indirectly synchronized with the master node via the reference node.

18 Claims, 12 Drawing Sheets

METHOD FOR ACCESSING A MEDIUM IN A SYNCHRONOUS COMMUNICATIONS NETWORK BY A TRANSMIT NODE, COMPUTER PROGRAM PRODUCT, STORAGE MEANS AND TRANSMIT NODE

1. FIELD OF THE INVENTION

The field of the invention is that of the management of access to a medium (also called a transmission carrier) in synchronous meshed networks.

The invention can be applied especially but not exclusively to access to a medium by the nodes of a 60 GHz wireless (radio) transmission system. 60 GHz radio transmission systems are particularly well suited to short-distance data transmission at very high bit rates. For example, such a transmission system is well suited to connectivity between the different elements of a "home cinema". In this case of use, the range of the transmission is limited to about ten meters but the bit rates brought into play are very high, sometimes over one gigabit per second because of the nature of the information transmitted (both audio and video information) and the high resolution of this information. In a communications network of this kind, it is necessary to be able to simultaneously support several concurrent audiovisual applications synchronously.

In a synchronous meshed network, there is a predetermined sequence of time intervals at the level of the MAC (medium access control) layer. It may be recalled that the MAC layer manages access to the medium and is a part of the data link level corresponding to layer 2 of the OSI model. Each node can send data during time slots or hops that are allocated to it. During each time slot or hop, the data is sent in a frame of fixed size, here below called a MAC frame (or packet). In other words, a synchronous meshed network applies a clocking that defines a network cycle for data transmission on this network. A super-frame forms part of each network cycle and includes a plurality of frames, each frame being associated with one of the nodes.

To preserve the synchronous character of such a synchronous network, it is therefore necessary to have a fixed time limit for the transmission of the data.

The present invention relates specifically to the management of the synchronization of medium access in a synchronous wireless meshed network.

2. PRIOR ART

Communications networks necessitate a sharing of the useful bandwidth between the different users of the network. The problem of medium access control consists in determining the node that is entitled to send data during a predetermined time slot or hop (called an access time slot) that starts at a given instant (called a start of access time slot).

There are various techniques of medium access. These techniques may be deterministic or random techniques.

Deterministic techniques are those in which the allocation of the band is done dynamically, as a function of the activity of the nodes (also called stations); this is the case with centralized control by polling where the master node questions the other nodes in turn to give them the possibility of sending or receiving. This is also the case with token-based protocols in which the right of access to the medium is given explicitly by the transfer of a particular frame called a token.

In random access techniques, each node takes a chance in trying to access the band. There are several techniques based on such a technique, for example the CSMA ("Carrier Sense Multiple Access") protocol. Such techniques then have to resolve problems of collision.

In CSMA type methods, the nodes tune in to the medium and wait for it to be free before sending. The transmission is not instantaneous because of time lags in the propagation of the communication signal, and a collision may occur when a node is sending, even if, during a predetermined time slot, it has tune in to the medium and has not received any data coming from another node of the communications network during this predetermined time slot. The greater the propagation times lags for the communications signals, the greater the risk of collision.

There are different variants of the CSMA protocol. The most classic one is that of the 802.3 networks: CSMA/CD (<<CD>> for <<Collision Detection>>).

Its particular feature is that the node remains tuned in to the medium after the start of transmission and stops transmission immediately if a collision is detected. The time during which a node is thus tuned in to the medium while it is sending data to the medium, is limited to a few microseconds (the round trip propagation time between the two furthest nodes). The duration of the collision is thus reduced to the minimum. The time needed to send out a frame cannot be guaranteed with the CSMA/CD. Indeed, fresh attempts at transmission of a same piece of data (or even of the same set of data) are made after a waiting time of a random duration that depends on the number of attempts: after 16 fruitless attempts, the node relinquishes the sending of the data. The value of this technique is that it does not necessitate the presence of a master node.

The token method can be used on a bus or ring type (network) topology. The token circulates from node to node. A node that receives and recognizes that token sent by the previous node can then access the medium. In normal operation, an optional phase of data transfer alternates with a phase of transfer of the token. Each node must therefore be capable of managing the reception and passage of the token in respecting the maximum time limit defined by the method. The nodes must also take account of the insertion of a new node. Finally, they must react to the deterioration or even the loss of the token by implementing a token-regenerating mechanism.

Although these known methods of medium access represent major progress in the collision-detecting mechanism, they nevertheless have the disadvantage of being inefficient when a node is shadowed from at least one other node of a communications network, especially in the case of a 60 GHz (radio) wireless transmission system. Indeed, there are many cases in which one or more nodes, called slave nodes, no longer see the same master node, which is the node of the network that clocks and defines the cycles of the communications network (network cycle). As shall be seen in greater detail here below, the network implements a super-frame forming part of each network cycle and comprising, according to a predetermined transmission sequence, a plurality of frames. Conventionally, each frame is associated with a node and is transmitted during the access time slot of the node.

Another means for synchronizing access to the medium, as is the case in a wireless network compliant with the GSM standard, consists of the sending of a beacon signal by a network master node at the beginning of the network cycle. This signal contains the instants of transmission assigned to the different modes of the network. This technique implies the systematic reception by all the nodes of the network of the beacon signal. This technique however cannot be applied in the case of a 60 GHz wireless communications system, given the random shadowing that may take place in time between the different nodes of the network.

3. GOALS OF THE INVENTION

The invention, in at least one embodiment, is aimed especially at overcoming these different drawbacks of the prior art.

More specifically, it is an aim of at least one embodiment of the invention to provide a technique of management of access to a medium in a synchronous communications network enabling improvement of the synchronization of the medium access (in the event of interference and/or shadowing) while at the same time preserving the synchronous character of the network.

It is another aim of the invention, in at least one of its embodiments, to implement a technique of this kind which is such that the synchronization with the master node is obtained speedily and efficiently.

It is another aim of the invention in at least one of its embodiments to implement a technique of this kind that averts a situation in which two slave nodes get synchronized with each other, without either of them being synchronized with the master node.

At least one embodiment of the invention is also aimed at providing a technique of this kind that is especially well-suited to all the existing network topologies (bus topology, ring topology, star topology etc).

The invention, in at least one of its embodiments, is also aimed at providing a technique of this kind that is simple to implement and costs little.

4. SUMMARY OF THE INVENTION

One particular embodiment of the invention proposes a method for accessing a medium by a transmit node in a synchronous communications network, said network comprising a plurality of nodes capable of accessing said medium during access time slots of predetermined duration to transmit data frames via said network, said plurality of nodes comprising a master node that implements a clocking that defines a network cycle for accessing said medium and comprising at least two slave nodes being slaves of said clocking including said transmit node, each network cycle comprising a plurality of frames transmitted during said access time slots according to a predetermined transmission sequence.

According to the invention, the transmit node performs the following steps:
  receiving at least one frame coming from at least one of the other nodes of the network;
  from each frame received, obtaining synchronization information pertaining to a level of synchronization of the node having sent said frame, said level of synchronization being relative to the master node;
  selecting a reference node from the node(s) from which at least one frame has been received, said selecting being done as a function of said synchronization information;
  determining a start of access time slot from the positions in said transmission sequence of the frames associated with the reference node and with said transmit node; and
  accessing said medium at said determined start of access time slot.

Thus, when the method is implemented:
  should there be no shadowing, a direct synchronization is made with the master node. In other words, the selected reference node is the master node;
  should there be a shadowing, a node distinct from the master node is selected; this amounts to making indirect synchronization with the master node. Indeed, synchronization information is used to select a reference node that is (directly or indirectly) synchronized with the master node from among a plurality of nodes visible in the network. Then, the positions in said transmission sequence of the frames associated with the reference node and with said slave node are used to determine the start of access time slot.

This technique preserves the synchronous character of the network and improves the reliability of the transmission (in the event of interference and/or shadowing).

It must be noted that the greater the number of nodes in the network, the greater the increase in the possibilities of indirect synchronization.

Advantageously, the step of selecting a reference node comprises a step of verifying, from the synchronization information, that at least one node from among the node(s) from which at least one frame has been received is/are synchronized with the master node. A given slave node is synchronized with the master node if it fulfils one of the following conditions:
  the master node is the reference node of said given slave node;
  the reference node of said given slave node is synchronized with the master node.

In a first advantageous embodiment, the synchronization information contained in a frame received from a given node is equal to the synchronization information contained in a frame coming from a node that said given node has selected as a reference node incremented by one unit.

Thus, the number of nodes located between the master node and the selected reference node is known. Indeed, the selected reference node has itself been able to select another reference node and so on and so forth in order to be synchronized with the master node. In this first embodiment, it is possible for example to take, as a reference node, the node whose current value (of the first counter) included in the synchronization information is the smallest value (in other words, the node selected as a reference node is the visible node comprising the smallest number of nodes between the master node and said visible node).

In a second advantageous embodiment, the synchronization information contained in a frame coming from a given node corresponds to a resynchronization drift of said given node relative to the master node, said drift being equal to a resynchronization drift of said given node relative to its reference node to which there is added a resynchronization drift of said reference node relative to the master node. A resynchronization drift of a slave node corresponds to a difference between an instant estimated by said slave node of reception of a frame and an effective instant of reception of this frame.

Advantageously, the step of verifying, on the basis of the synchronization information, that at least one node from among the nodes from which at least one frame has been received is synchronized with the master node, comprises a step of verifying that the synchronization information is stable over consecutive network cycles.

Advantageously, said reference node is selected from among the nodes whose frames contain synchronization information below a first threshold, said first threshold being defined as a function of the number of nodes present in the network.

Advantageously, for each network cycle, said obtaining and selecting steps are performed after each reception of a new frame. Said step of determining a start of access time slot is performed after each selecting step during which a new reference node is selected. At each new execution of said determining step, a timeout mechanism is activated with a timeout duration that is a function of the positions, in said transmission sequence, of the frames associated with said new reference node and with said slave node. The end of the passage of said timeout duration elapsing indicates said start of access time slot if said timeout mechanism is not activated again during said timeout duration.

According to an advantageous characteristic, for a given network cycle, if no new reference node whatsoever can be selected during said selecting step, the transmit node performs the following steps:
- incrementing by one unit a counter of network cycles without resynchronization;
- if the value of said counter for said given network cycle is smaller than or equal to a second threshold, said start of access time slot corresponding to an instant of elapsing of a timeout that has a duration equal to the duration of a network cycle and that is activated at the start of the access time slot, of said transmit node, of the network cycle preceding said given network cycle.

Thus, if a reference node has been successfully selected for synchronization with the master node in a previous cycle while it is not possible, in the current cycle, to select any new reference node, then the reference node selected in the previous cycle is kept in order to get synchronized with the master node in the current cycle. But this is possible only for a predetermined number of times.

In another embodiment, the invention relates to a computer program product downloadable from a communications network and/or recorded on a computer-readable carrier and/or executable by a processor, said computer program product comprising program code instructions for the implementation of the above-mentioned access method when said program is executed on a computer.

In another embodiment, the invention relates to a computer-readable storage means, possibly wholly or partially detachable, storing a set of instructions executable by said computer to implement the above-mentioned access method.

In another embodiment, the invention pertains to a transmit node comprising means for accessing a medium in a synchronous communications network, said network comprising a plurality of nodes capable of accessing said medium during access time slots of predetermined duration to transmit data frames via said network, said plurality of nodes comprising a master node that implements a clocking that defines a network cycle for accessing said medium and comprising at least two slave nodes being slaves of said clocking including said transmit node, each network cycle comprising a plurality of frames transmitted during said access time slots according to a predetermined transmission sequence.

According to the invention, the transmit node comprises:
- means for receiving at least one frame coming from at least one of the other nodes of the network;
- from each frame received, means for obtaining synchronization information pertaining to a level of synchronization of the node having sent said frame, said level of synchronization being relative to the master node;
- means for selecting a reference node from the node(s) from which at least one frame has been received as a function of said pieces of synchronization information;
- means for determining a start of access time slot from the positions in said transmission sequence of the frames associated with the reference node and with said transmit node.

The advantages of the computer program, storage means and transmit node are substantially the same as those of the synchronization method and are therefore not taken up again here below.

Advantageously, said means for selecting a reference node comprise first means for verifying, from the synchronization information, that at least one node from among the node(s) from which at least one frame has been received is/are synchronized with the master node.

In a first advantageous embodiment, the synchronization information contained in a frame received from a given node is equal to the synchronization information contained in a frame coming from a node that said given node has selected as a reference node incremented by one unit.

In a second advantageous embodiment, the synchronization information contained in a frame coming from a given node corresponds to a resynchronization drift of said given node relative to the master node, said drift being equal to a resynchronization drift of said given node relative to its reference node to which there is added a resynchronization drift of said reference node relative to the master node. A resynchronization drift of a slave node corresponds to a difference between an instant estimated by said slave node of reception of a frame and an effective instant of reception of this frame.

According to a preferred embodiment of the invention, said first means for verifying comprise second means for verifying that the synchronization information is stable over consecutive network cycles.

Advantageously, said means for selecting a reference node comprise means for comparing a piece of synchronization information with a first threshold, said selection means selecting said reference node from among the nodes whose frames contain a piece of synchronization information below said first threshold, said first threshold being defined as a function of the number of nodes present in the network.

Advantageously, said reading and selecting means are activated after each reception of a new frame. Said means for determining a start of access time slot are activated after each activation of said selecting means. The transmit node further comprises timeout means. The timeout means are activated after each new activation of said means for determining a start of access time slot. The timeout means comprise a timeout duration that is a function, of the positions, in said transmission sequence, of the frames associated with said new reference node and with said slave node. The end of the passage of said timeout duration indicates said start of access time slot if said timeout means are not activated again during said timeout duration.

Advantageously, the transmit node comprises means for incrementing by one unit a counter of network cycles without resynchronization. If the value of said counter for said given network cycle is smaller than or equal to a second threshold, said start of access time slot corresponding to an instant of elapsing of a timeout that has a duration equal to the duration of a network cycle and that is activated at the start of the access time slot, of said transmit node, of the network cycle preceding said given network cycle.

5. LIST OF FIGURES

Other features and advantages of embodiment of the invention shall appear from the following description, given by way of an indicative and non-exhaustive example (the embodiments of the invention are not all limited to the characteristics and advantages of the embodiments described here below) and from the appended drawings of which:

Figure 3:
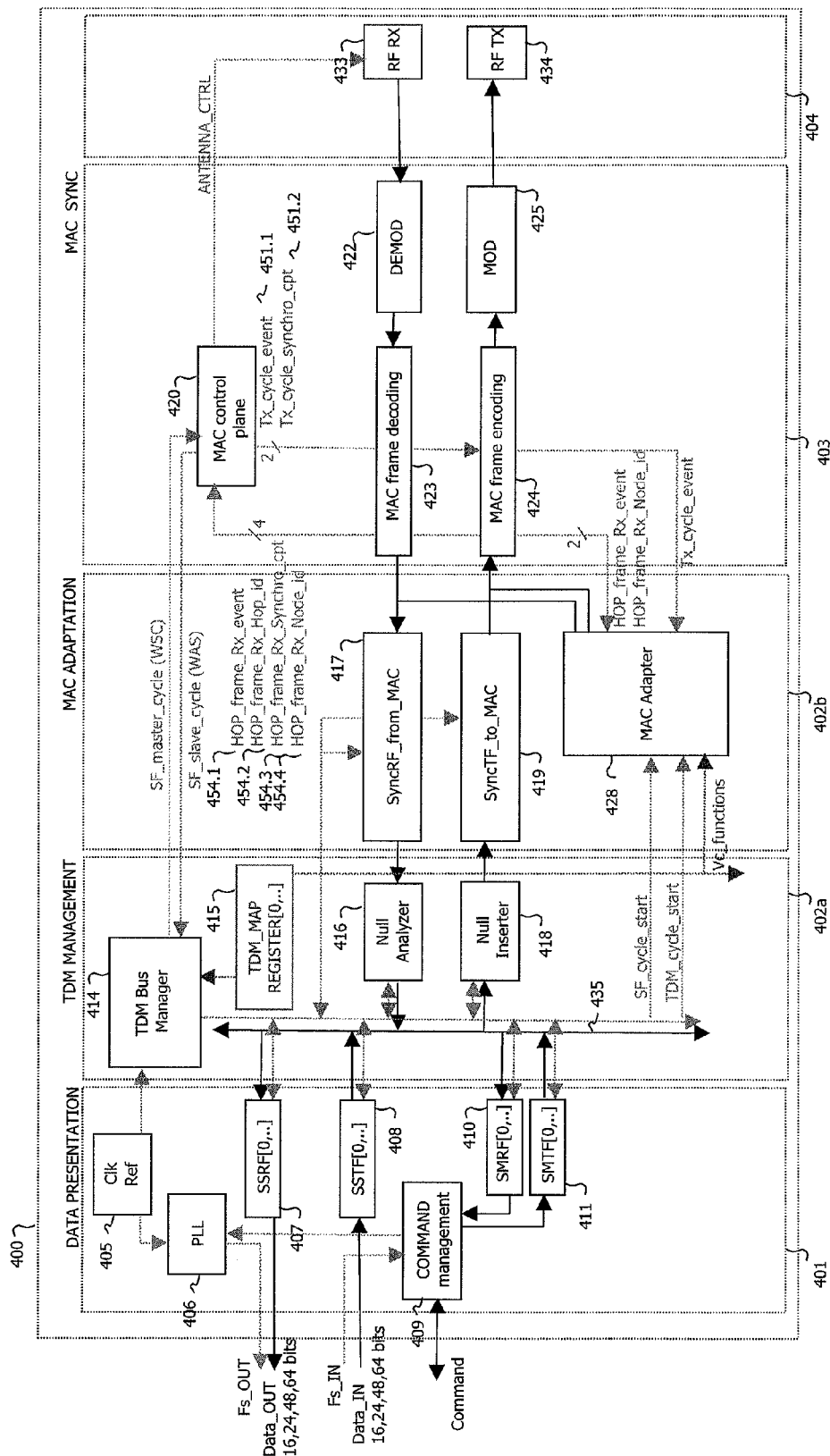
FIG. 3 is a drawing of a generic node of the wireless meshed network according to a particular embodiment of the invention.
Figure 4:
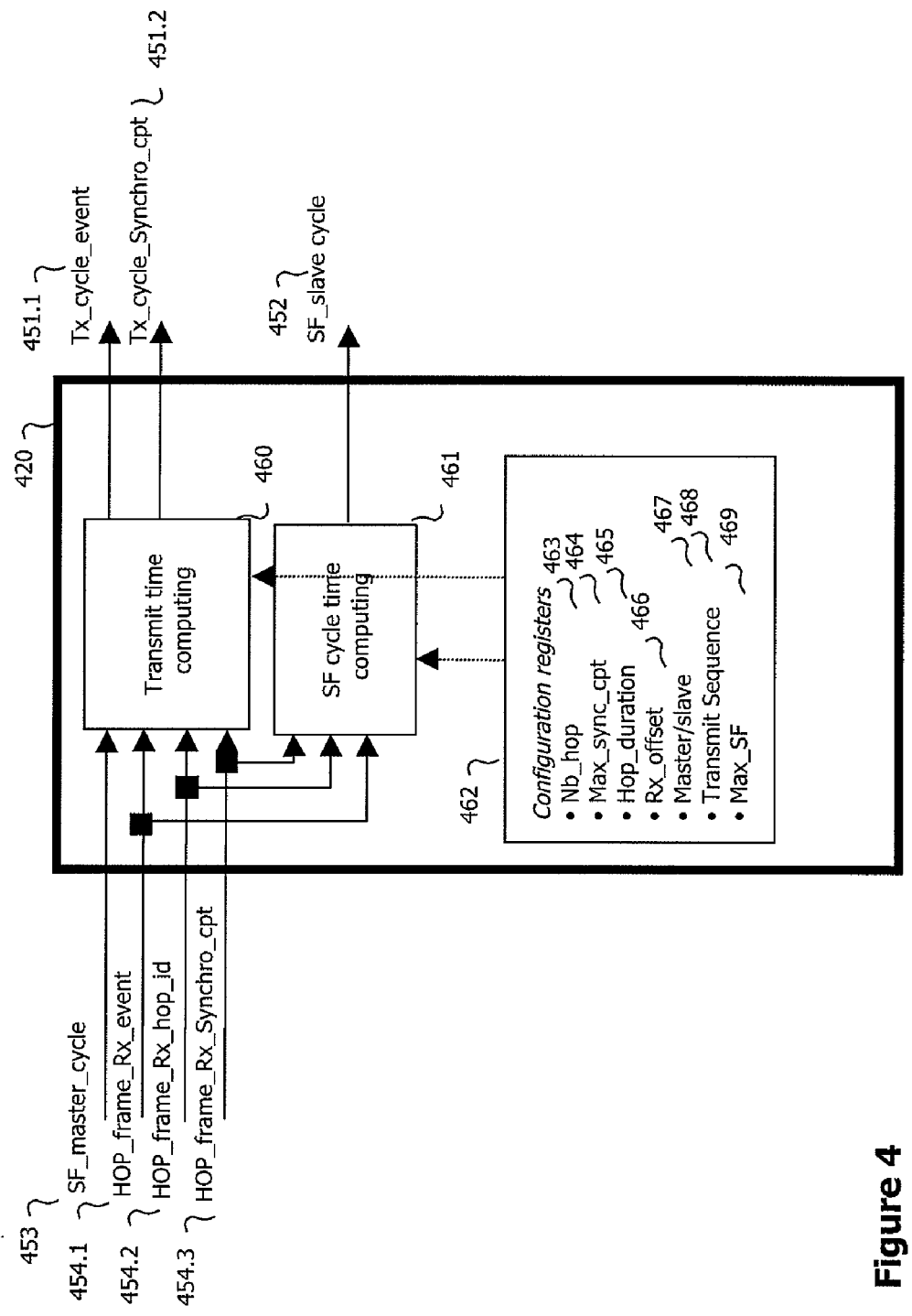
Figure 5A:
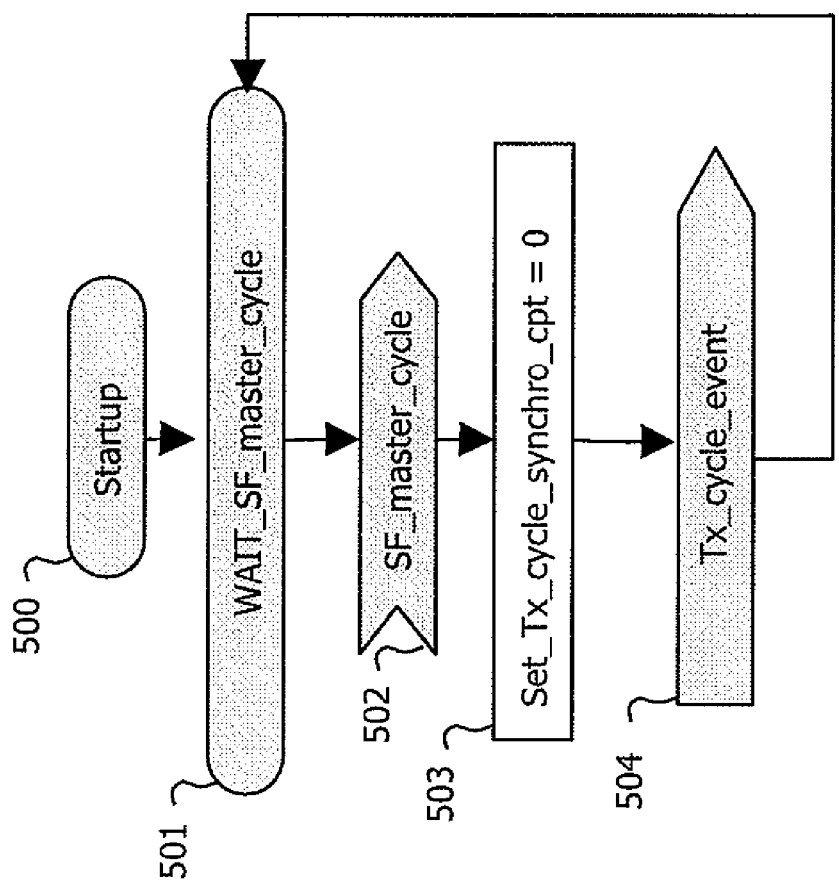
Figure 5B:
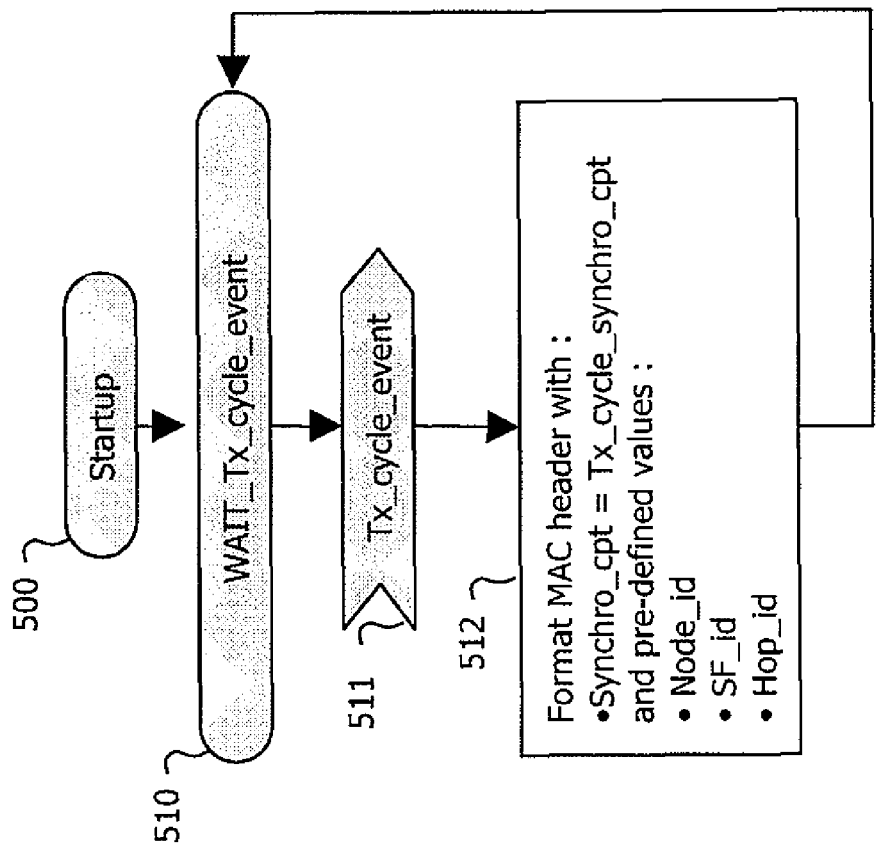
Figure 5C:
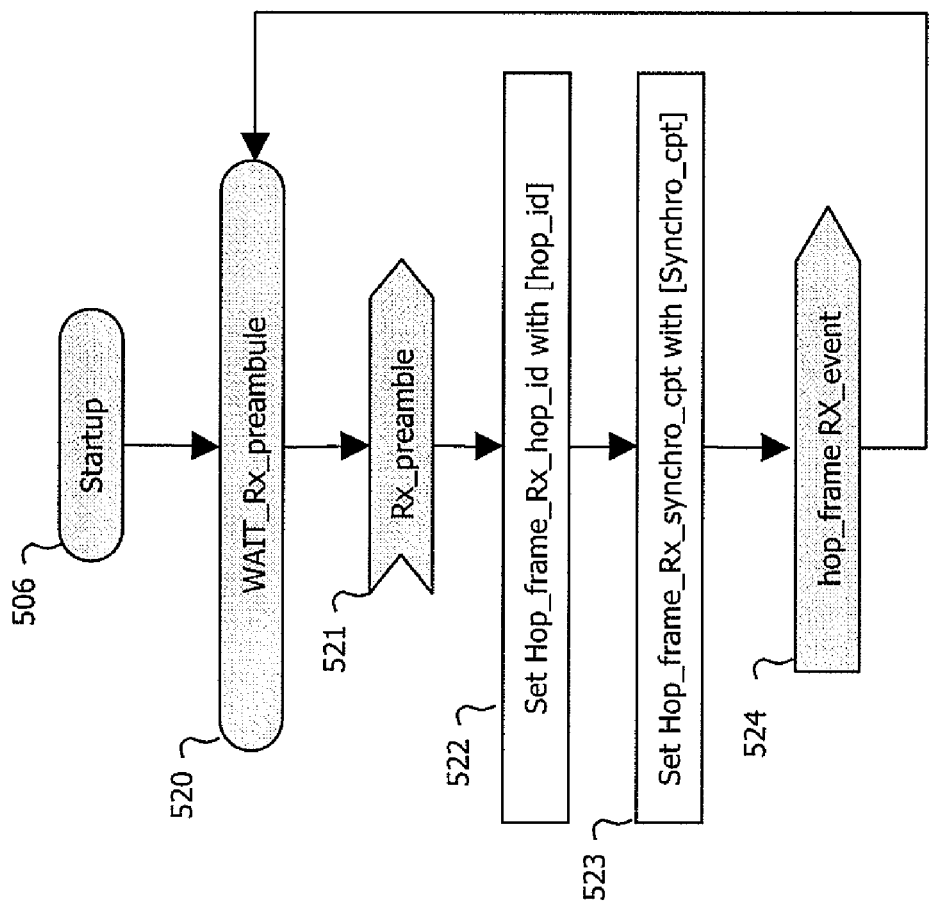
Figure 6:
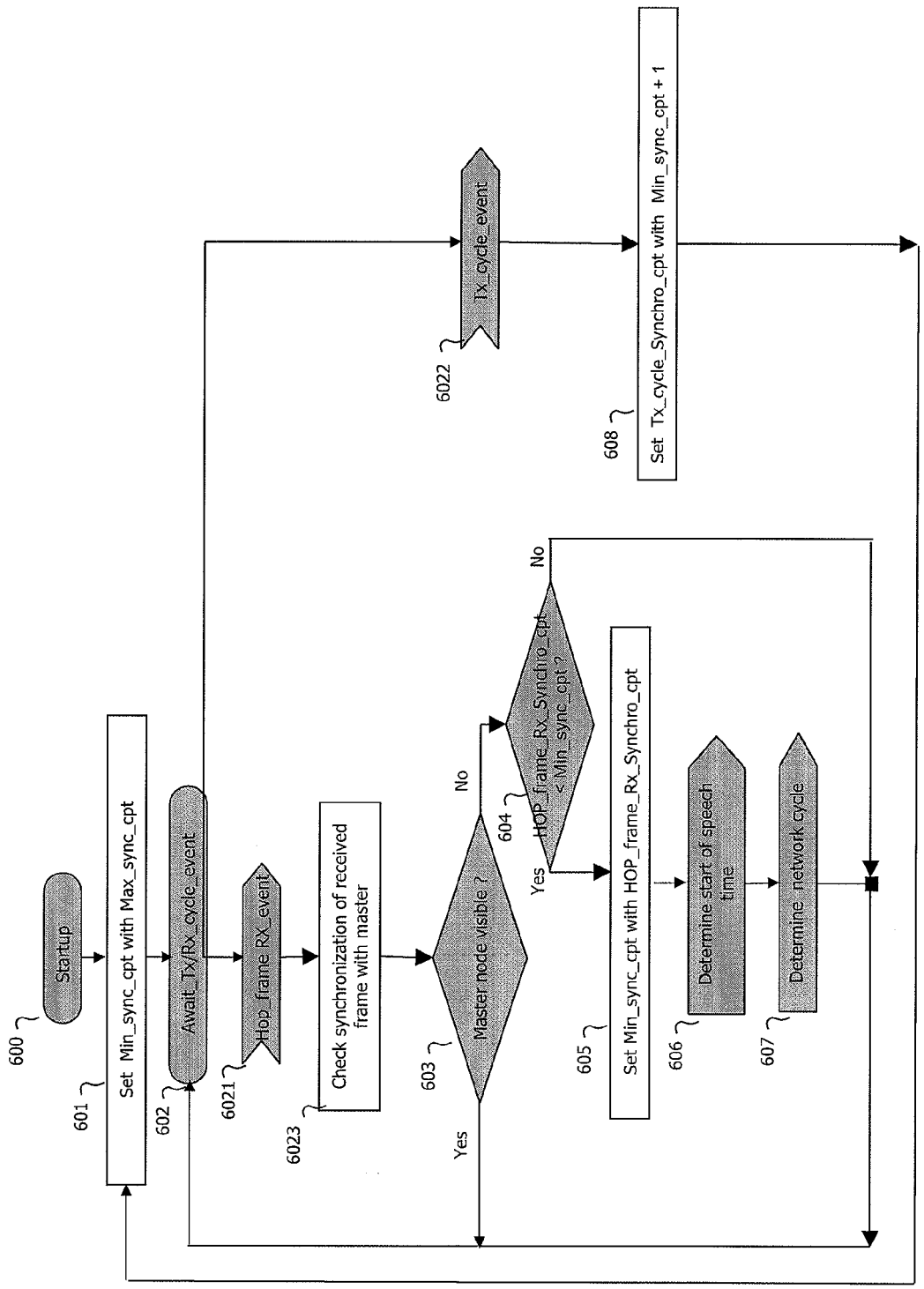
Figure 7:
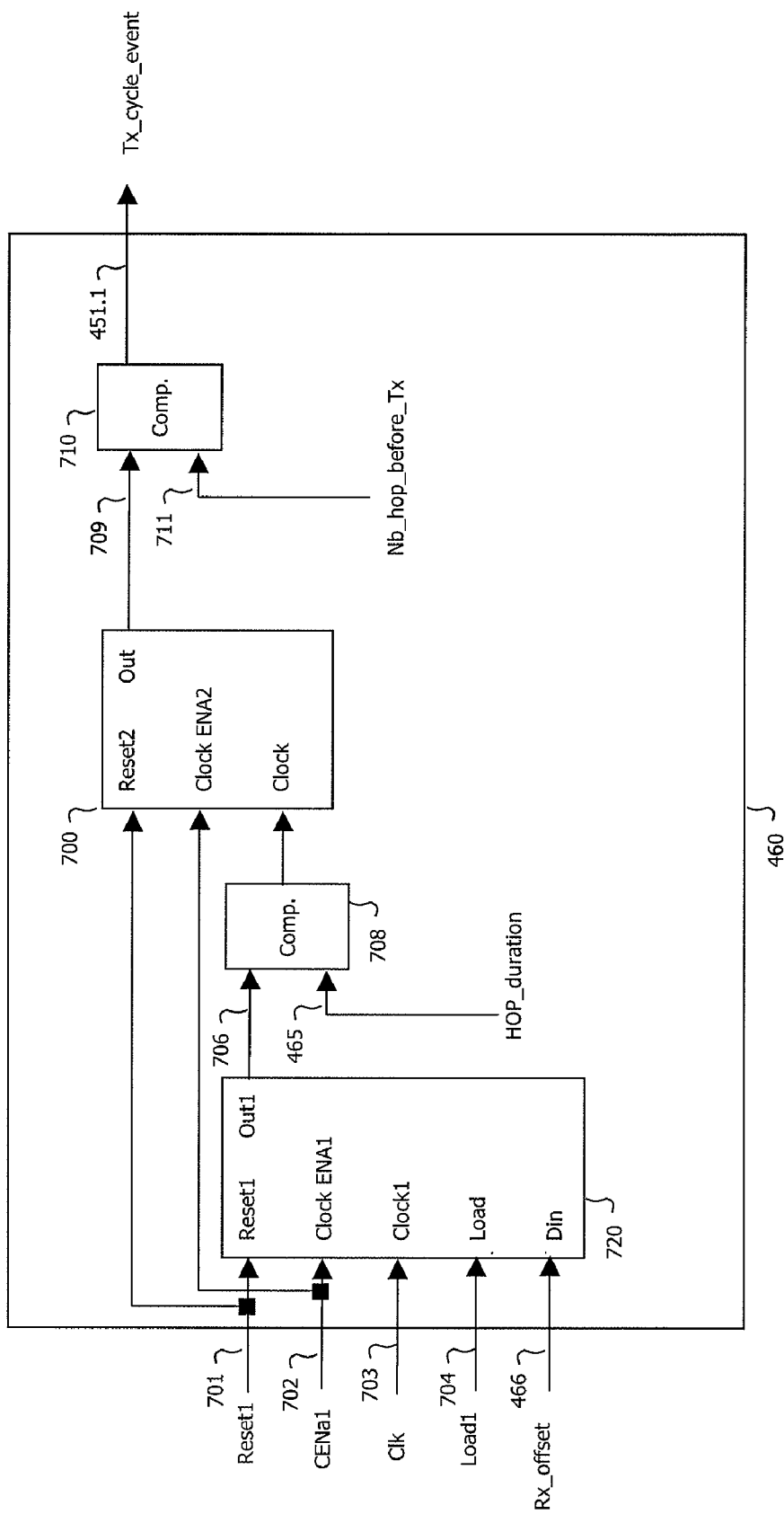
Figure 8:
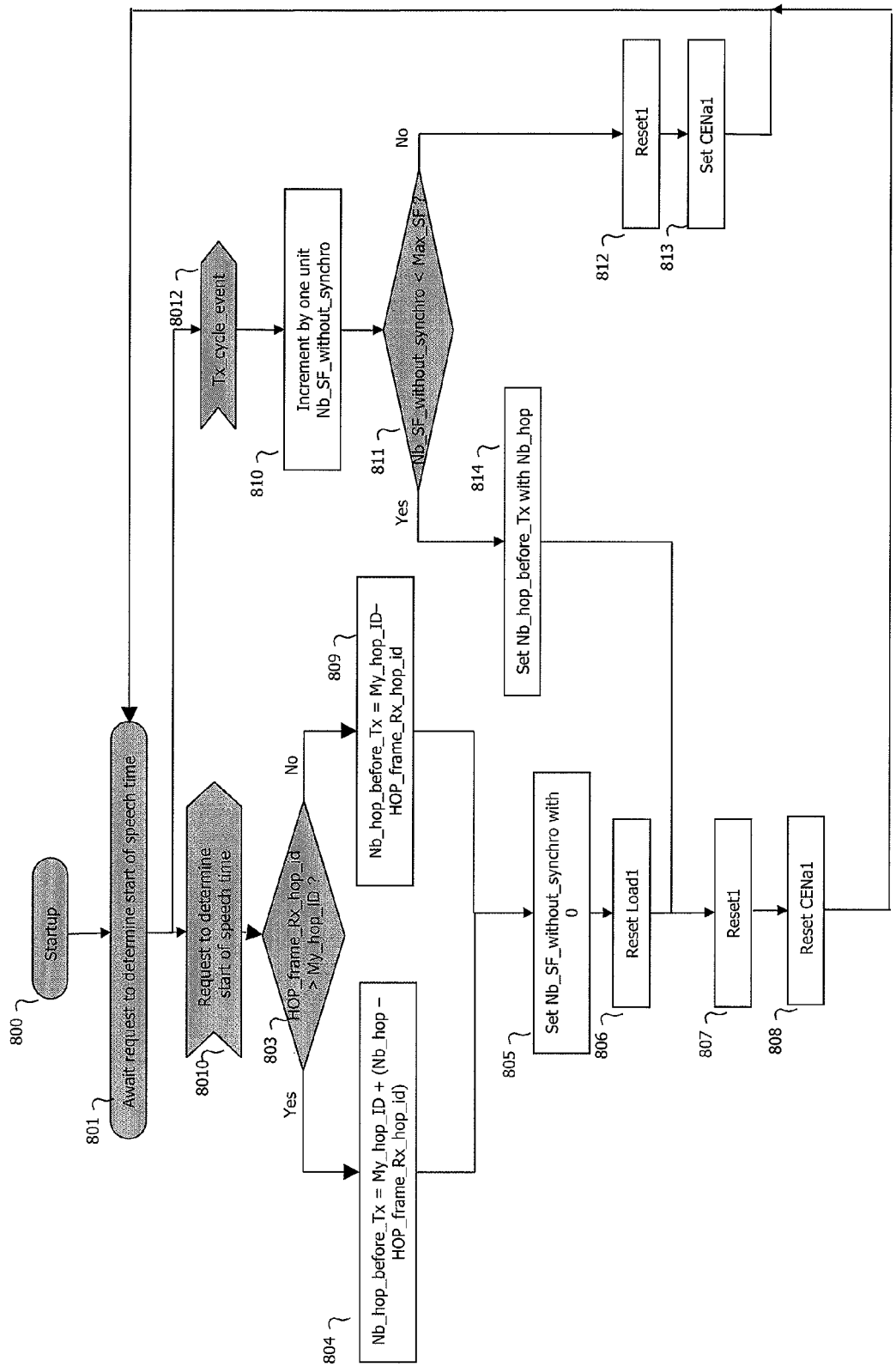
Figure 9:
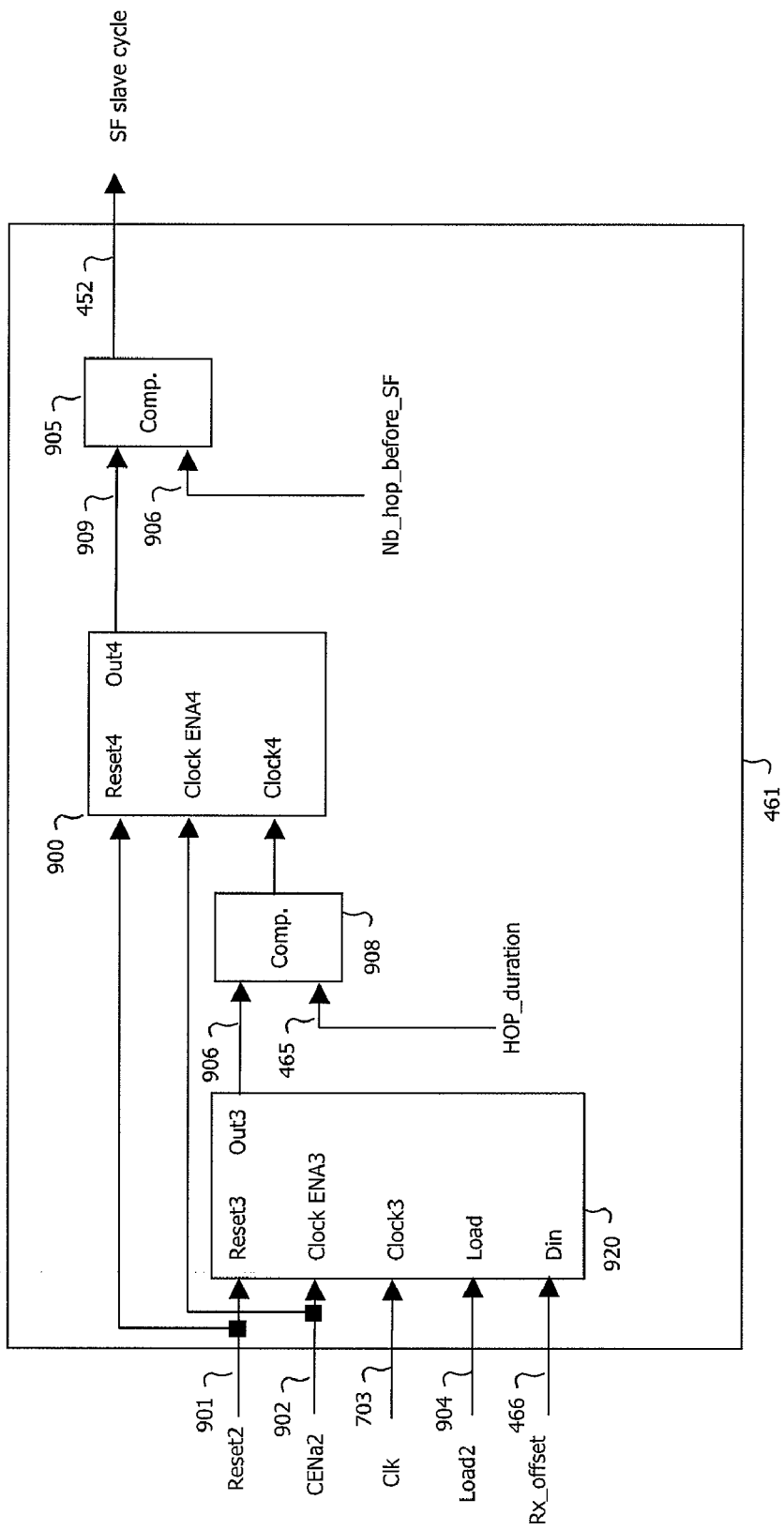
Figure 10:
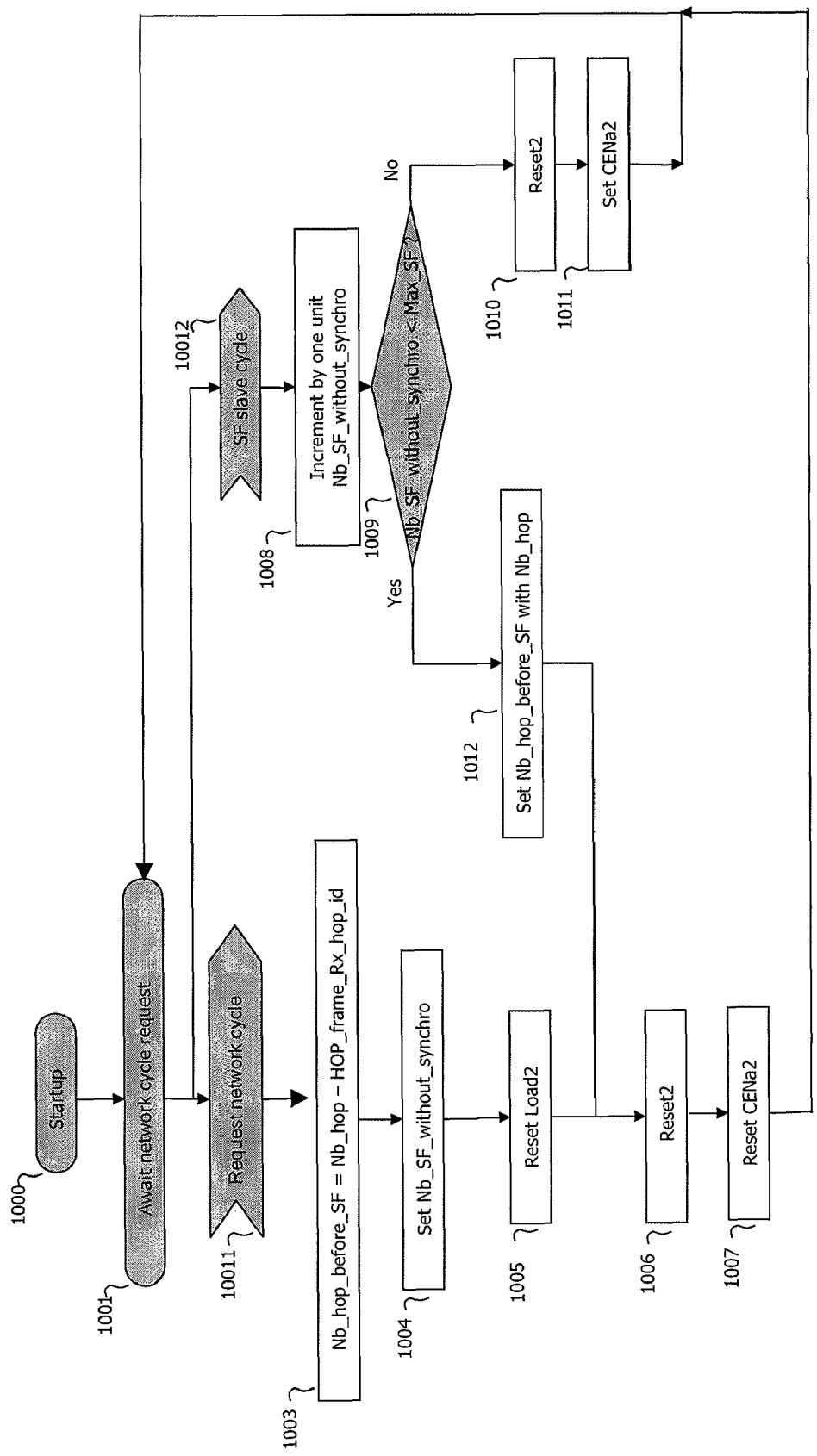

FIG. 4 presents an example of an architecture of the MAC controller shown in FIG. 3, according to a particular embodiment of the invention;

FIG. 5a presents the main steps of a processing algorithm implemented by the MAC controller, included in a master node and appearing in FIG. 3 according to a particular embodiment of the invention;

FIG. 5b presents the main steps of a processing algorithm implemented by the MAC frame encoding module, included in a generic node and appearing in FIG. 3 according to a particular embodiment of the invention;

FIG. 5c presents the main steps of a processing algorithm implemented by the MAC decoder, included in a generic node and appearing in FIG. 3 according to a particular embodiment of the invention;

FIG. 6 presents the main steps of a processing algorithm implemented by the MAC controller, included in a slave node and appearing in FIG. 3 according to a particular embodiment of the invention;

FIG. 7 presents an example of an architecture of the access time slot processing module appearing in FIG. 4, according to a particular embodiment of the invention;

FIG. 8 presents the main steps of a counter management algorithm included in the access time slot processing module and appearing in FIG. 7, according to a particular embodiment of the invention;

FIG. 9 presents an example of an architecture of the network cycle processing module appearing in FIG. 4, according to a particular embodiment of the invention;

FIG. 10 presents the main steps of a counter management algorithm, included in the network cycle processing module and appearing in FIG. 9, according to a particular embodiment of the invention.

6. DETAILED DESCRIPTION

In all the figures of the present document, the identical elements and steps are designated by a same numerical reference.

The description of a particular application of the method of access according to a particular embodiment of the invention is situated here below in the context of a communications network 1000 which is a 5.1 type "home cinema" or "home theater" network illustrated by FIG. 1. Naturally, the invention can also be applied in the context of a 7.1 type "home cinema" network.

Naturally, other embodiments of the invention can be situated in any communications network in which it is necessary to simultaneously implement several concurrent synchronous applications such as, for example, one of the following networks:

a network based on multiple video sources connected to a display device (multipoint-to-point type network);

a network based on multiple video sources connected to multiple display devices (multipoint-to-multipoint type network).

In the context of the 5.1 home cinema network 1000, the speakers are connected to the audio source by means of a meshed wireless network 101.

The 5.1 home cinema network 1000 comprises an audio-video source terminal 102 (for example a DVD player), a television screen 103, a first speaker 104, called a center speaker 104, a second speaker 105, called a subwoofer 105, a third speaker 106, called a front-left speaker 106, a fourth speaker 107, called a front-right speaker 107, a fifth speaker 108, called a right ambience or surround right speaker 108 and a sixth speaker 109, called a left ambience or surround left speaker 109. Each speaker plays one of the six audio channels delivered by the source terminal 102.

In order to make the meshed wireless network 101, the invention uses a wireless ambience controller 110 here below called a WSC ("Wireless Surround Controller") node 110 and first, second, third, fourth, fifth and sixth active wireless speakers 111, hereinafter called WAS ("Wireless Active Speaker") nodes 111, each being associated with one of the above-mentioned speakers.

The function of a WAS node 111 is to set up an interface between the speaker with which it is associated and the WSC node 110 in the wireless meshed node 101. Each WAS node 111 is connected to the speaker with which it is associated by a coaxial cable 116. For a given WAS node 111, depending on the location of the amplifier and of the digital/analog converters (in the WAS node or in the speaker), the cable 116 conveys digital or analog audio signals.

Figure 1:
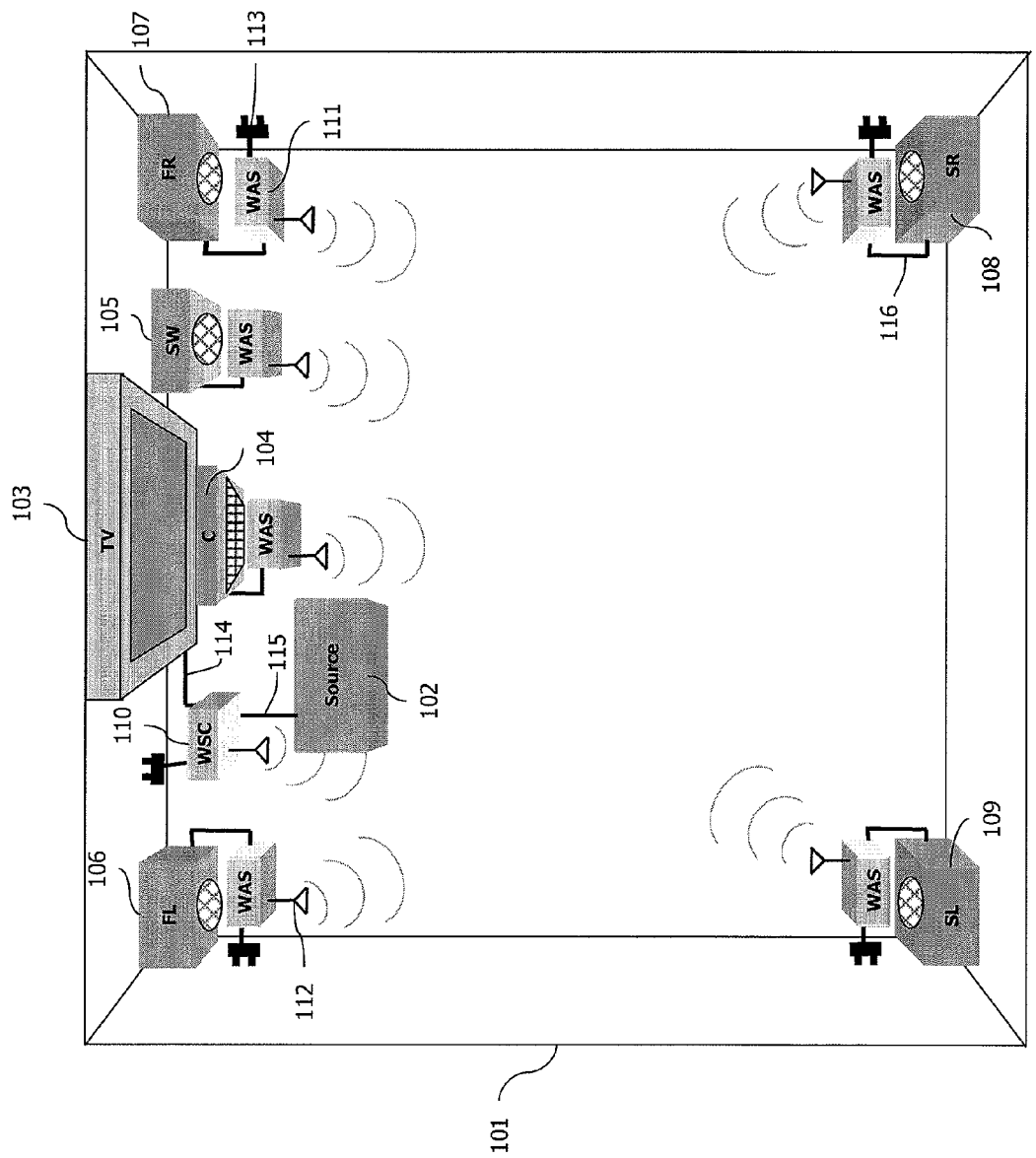
FIG. 1 is a drawing of a communications network in which it is possible to implement methods according to a particular embodiment of the invention.

The WAS node 111 and the WSC node 110 are each powered by a power connector 113 (this power connector is not represented for each of the nodes 110, 111 in FIG. 1) and each of them comprises one antenna 112 in order to implement wireless communications. The antenna 112 is preferably an electronically steerable electromagnetic antenna.

The WSC node 110 receives audio-video streams transmitted by the audio-video source terminal 102 through a cable 115. Then, through a wireless communication, it transmits the digital audio data coming from the received audio-video streams to all the speakers and, through a cable 114, it transmits digital video data from the received audio-video streams to the television screen 103. For example, the cables 114 and 115 are compliant with the HDMI ("High Definition Multimedia Interface") protocol. The source terminal 102 or the WSC node 110 comprises an audio channel decoder in order to identify and separate the audio data samples of each channel. Furthermore, they include an ambience processor to apply modifications to the audio samples as a function of the acoustic characteristics of the room.

In order to enhance the compactness of the system, the WSC node 110 may be integrated into the source terminal 102 and each WAS node 111 may be integrated into the speaker with which it is associated.

In the present network 1000, the following time constraints are critical:

the relative time lag between the audio signal and the video signal coming from a same audio-video content must be minimized:

the relative time lag between transmission from the different speakers (between the audio channels) must be minimized.

The relative time lag between the audio signal and the video signal coming from a same audio-video content, generally called "lip synchronization", must be minimized. For user comfort, the relative time lag between the audio signal and the video signal must remain within the interval ranging from −45 ms to +15 ms, as described in ATSC standard IS 191 document. In the case of wireless connections, the radio transmitters/receivers add time lags due to the transmission. The audio signal is thus offset relative to the video signal. If this offset becomes greater than hundred milliseconds, then it is necessary to delay the video signal at output of the source terminal 102.

In the home cinema network 1000, the distance between the listening stations for the user and the speaker generally varies according to the speaker considered. Owing to the speed of propagation of sound in the air (approximately 343 m/s), the time of propagation of the sound wave from the speaker to the listening station is different for each audio channel. For example, a difference in propagation path of 34 cm between two audio channels implies a time lag of one ms at reception between the two audio channels. Thus, in order to preserve acceptable relative time lags (i.e. below 100 μs), most home cinema systems implement a mechanism of automatic compensation for these time lags.

At the installation of the meshed network 101, special attention must be paid to compliance with time constraints. The present invention ensures that the transmission time in the network is fixed. Furthermore, in the context of the network 1000, compensation for time lags due to the effects of distance is obtained at output of the WAS nodes 111.

Thus, each WAS node 111 simultaneously delivers an audio sample at its consumer (or receiver) application layer, this audio sample coming from a generator (or sender) application of the WSC 110 after a delay that is fixed and common to the WAS nodes. The compensation for the time lags due to the effects of distance is achieved in each WAS node before entry into the amplification stage.

In the network 1000 of this FIG. 1, a 1 to N (N=6) type communication (i.e. point-to-multipoint type communication) is made from the WSC node 110 to the six WAS nodes 111. Advantageously, the WSC node and the WAS node are each capable of transmitting and receiving data thus enabling N to N, i.e. multipoint-to-multipoint type communications to be set up.

The method of access according to the invention (described in greater detail with reference to FIGS. 5a, 5b, 5c, 6, 8 and 10) is implemented in the form of a software program and/or a plurality of software sub-programs (comprising a plurality of algorithms described here below) executed in several machines of the network 1000, for example in the WSC node 110 and in the WAS nodes 111.

Figure 2:
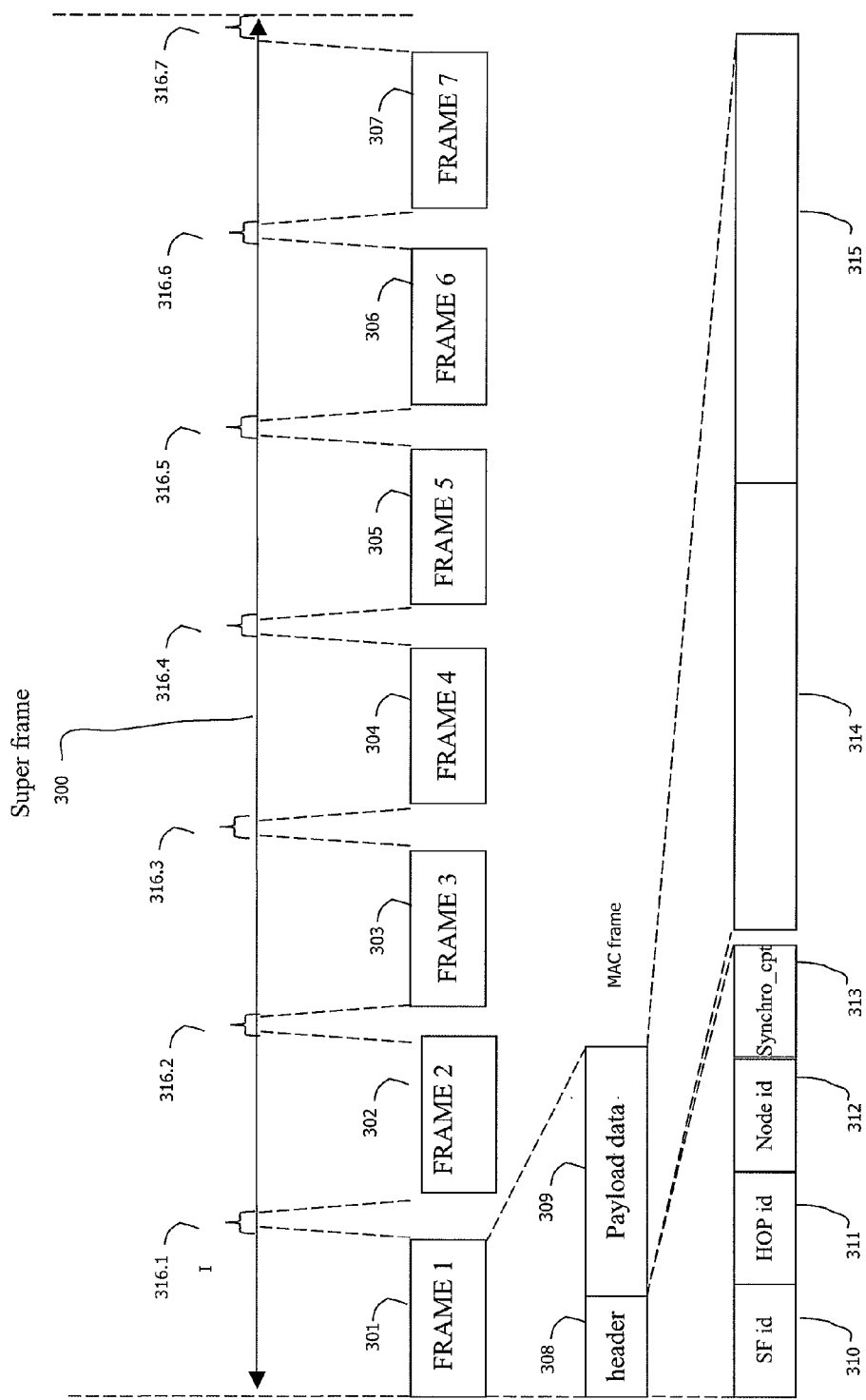
FIG. 2 is a drawing of a transmission cycle of the wireless meshed network of FIG. 1, according to a particular embodiment of the invention.

FIG. 2 is a drawing of a network cycle 313 of transmission in the wireless meshed network 101.

The super-frame 300 forms part of a network cycle 313 of fixed duration, for example a duration of 1 ms. During this period, each WSC or WAS node of the network 101 sends its MAC frame in the wireless meshed network 101 during its access time slot and in a predefined sending sequence. Thus, the frame 1 is sent by the WSC node 110 and the second (frame 2) to seventh (frame 7) frames are sent respectively by the first to sixth WAS nodes. These first to seventh MAC nodes form the super-frame 300.

The first frame (frame 1) in the super-frame 300 corresponds to the sending of the MAC frame from the master node which is the WSC node 110. This frame is called the starting frame (or "head_hop"). The nodes WAS1 to WAS6 are slave nodes. Indeed, the WSC node 110 is the node of the network that clocks the meshed network 101 and defines the cycles of the meshed network in generating the network cycle start signal SF-master-cycle 453.

Each MAC frame has a MAC header 308 and a payload data field 309. The MAC header 308 has four fields:
   the <<SF_id>> field 310 which identifies the super-frame 300. For example, the super-frame can allocate the frame 1 to the node 1, the frame 2 to the node 2, the frame 3 to the node 3, the frame 4 to the node 4, the frame 5 to the node 5, the frame 6 to the node 6 and the frame 7 to the node 7, or else a different allocation, for example the frame 1 to the node 4, the frame 2 to the node 1, the frame 3 to the node 3, the frame 4 to the node 1, the frame 5 to the node 7, the frame 6 to the node 6 and the frame 7 to the node 5;
   the "HOP_id" field 311 which comprises an identifier of the MAC frame;
   the "NODE_id" field 312 which comprises an identifier of the node that sends the MAC frame, and
   the "SYNCHRO_CPT" field 317 comprising a piece of information on synchronization at a level of synchronization relative to the master node (described in greater detail with reference to FIGS. 3 and 4).

In one particular embodiment, the information on synchronization comprises a current value of a counter equal to that of the counter associated with the node that the slave node selects as a reference node, incremented by one unit. This counter, updated by each slave node at the step 608 of the flow chart of FIG. 6, provides an indication regarding the presence in the synchronization chain of a slave node directly synchronized with the master node (the master node is not shadowed from the slave node). The term "synchronization chain" is understood to mean the set of slave nodes that get synchronized with one another in order to mitigate the effects of shadowing of the master node relative to the slave nodes. A slave node is then deemed to be synchronized with the master node when it complies with the following conditions:
   the node makes direct use of the master node as a reference node;
   the node uses a slave node synchronized with the master node as its reference node.

When there is no longer any slave node in the synchronization chain that is synchronized with the master node, i.e. when the slave nodes get synchronized with one another (for example a node A gets synchronized with a node B which is itself synchronized with the node A) the value of this counter will increase as and when the frames (of the nodes A and B in the above-mentioned example) and the transmission cycles occur in the communications network. If a slave node in the synchronization chain is synchronized with the master node, the value of the counter will tend to get stabilized (a node will get synchronized with the same node for a certain number of consecutive cycles). A slave node can then detect the fact that the value of this counter increases continually as and when the frames and the transmission cycles occur in the communications network. It is also possible for the slave node to detect the fact that this value has gone beyond a maximum threshold defined as a function of the number of nodes in the network (there cannot be more than N−2 intermediate nodes in the direction of synchronization between a slave node and the master node, N being the number of nodes of the communications network).

In one alternative embodiment, the information on synchronization includes a piece of information on resynchronization drift of the given slave node relative to the master node.

The information on resynchronization drift corresponds to the difference between an estimated instant (estimated by the slave node considered) of reception of the synchronizing frame (the received frame as of which the slave node considered gets synchronized) and the effective instant of reception of this frame.

The slave node estimates the instant of reception of the synchronizing frame (which may be the frame of the master node) by building a representation of the network cycle and of the access time slot starting instants (the transmission sequence and the access time slot duration assigned to each of the notes of the sequence as well as a value of an inter-frame waiting interval being known) by means of its clock for clocking data-processing operations. This information then represents the drift of the slave node relative to the node sending the frame with which said slave node gets synchronized.

This information on synchronization drift, updated by each slave node at the step 608 of the flow chart of FIG. 6, gives an indication on the presence in the synchronization sequence, of a slave node directly synchronized with the master node (the master node is not shadowed from the slave node). Indeed, when there is no longer any slave node in the synchronization chain that is synchronized with the master node, i.e. when the slave nodes get synchronized with one another (for example a node A gets synchronized with a node B which is itself synchronized with the node A), this value will increase as and when the frames (of the nodes A and B in the above-mentioned example) and the transmission cycles occur in the communications network. If a slave node in the synchronization chain is synchronized with the master node, the value of the counter will tend to get stabilized (a node will get synchronized with the same node for a certain number of consecutive cycles). A slave node can then detect the fact that the value of this counter increases continually as and when the frames and the transmission cycles occur in the communications network. It is also possible for the slave node to detect the fact that this value has gone beyond a maximum threshold defined as a function of the number of nodes in the network (there cannot be more than N−2 intermediate nodes in the direction of synchronization between a slave node and the master node, N being the number of nodes of the communications network) and the maximum possible drift per node of the communications network, this drift being predefined by construction of the slave node and being a function of the precision of its clock for clocking processing operations.

It can then be noted that, preferably, inter-frame waiting times referenced <<inter_frames 316.1 to 316.7>>, are planned between the frames Frame 1 to Frame 7 in order to absorb the jitter generated by the different nodes of the network and in order to enable the switching of the nodes between the transmit mode and the receive mode or to enable the reorientation of the antennas.

FIG. 3 is a drawing of a generic node 400 of the wireless meshed network 101 according to the particular embodiment of the invention. For example, each of the WSC nodes and WAS nodes of the wireless mesh network 101 is identical to the generic node 400.

The generic node 400 comprises the following five modules:
- a data presentation module 401 responsible for obtaining data from a data transmitting (or generating) module and providing or presenting data to a data receiving (or consuming) module;
- a TDM manager module 402*a* responsible for implementing a TDM type time-division multiplexing within the nodes of the meshed network 101. This module 402*a* is used as a transportation layer by the data presentation module 401;
- a MAC adaptation module 402*b* enabling the implementation of the wireless meshed network 101 and carrying out the adaptation between the arrangement in the form of virtual channels of the TDM manager module 402*a* and the arrangement in the form of MAC frames of a MAC synchronization module 403 described here below;

The MAC synchronization module 403 which implements the MAC medium access protocol. It is in charge of error correction of the FEC (forward error correction) type and of the synchronization of medium access. In the case of a slave node, it gives the time synchronization to the TDM manager module 402*a*. It also carries out the modulation and demodulation of data addressed to or coming from a radio module 404 described here below; the radio module 404 is the analog part of the access to the medium. It is adapted to communication (transmit/receive) by means of millimeter waves.

As will be seen here below, a MAC controller 420 (described in greater detail with reference to FIGS. 4 to 8) implements the access method of the invention. The MAC controller 420 receives four signals referenced SF_master_cycle 453, HOP_frame_Rx_event 454.1, HOP_frame_Rx_hop_id 454.2 and HOP_frame_Rx_Synchro_cpt 454.3, and delivers three signals referenced Tx_cycle_event 451.1, Tx_cycle_Synchro_cpt 451.2 and SF_slave_cycle 452.

The pieces of data coming from the transmit (or generator) module are stored in a set of synchronous stream transmit FIFOs (SSTFs) 408 by a transmitter (or generator) application at a frequency referenced Fs_IN.

The data addressed to the receive application is stored in a set of SSRFs (Synchronous Stream Receive FIFOs) 407 by a TDM bus manager 414. These pieces of data are read by the receive application at a frequency referenced Fs_OUT.

The application can send and receive control commands by means of a command manager interface 409 and a set of transmit/receive FIFOs comprising a set of "Synchronous Message Receive FIFOs" (SMRF) 410 and a set of Synchronous Message Transmit FIFOs (SMTF) 411. The messages are sent and received in using reserved TDM virtual channels for this purpose.

The generic node 400 comprises a reference clock 405 used by the TDM bus manager 414 to define the TDM cycles and the network cycles. This reference clock is also used by a phase-locked loop (PLL) 406 to generate the frequency Fs_OUT.

The configuration of the phase-locked loop (or PLL) 406 for the generation of the frequency Fs_OUT is done by the command management interface 409. At input of the generic node 400, the command management interface 409 detects and transmits the value of the frequency Fs_IN through the synchronous message transmission FIFO 411. In a distant node (i.e. distant relative to the node 400), the command management interface of this distant node receives this value of the frequency Fs_IN through the synchronous messages receive FIFO of this distant node. Thus the distant node can configure its phase-locked loop in order to deliver the same frequency value.

The TDM bus manager 414 controls a data bus 435 which interconnects the FIFOs SSRF 407, the SSTF 408, the SMRF 410, the SMTF 411, a "null" analyzer 416 and a "null" inserter 418. The TDM bus manager 414 distributes or maps the application data on to TDM virtual channels. This distribution is defined by the already mentioned TDM distribution or mapping register TDM_MAP 415.

At each TDM cycle, the TDM bus manager 414 requests the null inserter 418 to read the data of the transmitter application either from the SSTF FIFO 408 or from the SMTF FIFO 411 for all the write-allocated virtual channels. It can happen that there is not enough data in the SSTF and SMTF FIFOs to satisfy all the allocated virtual channels. In this case, the null inserter 418 adds "null" symbols so as to fill the write-allocated virtual channels for which a quantity of data is missing. The "null" symbols are inserted to ensure that the TDM bus manager 414 will always send the same sequence of virtual channels, i.e. the same quantity of data at each network cycle, thus providing for the synchronization of the transmit and receive applications in using strictly the same sequence of virtual channels at each cycle.

Furthermore, at each TDM cycle, the manager of the TDM bus 414 requests the null analyzer 416 to obtain the TDM data from a FIFO SyncRF_from_MAC 417. These pieces of data are written either to the SSRF 407 or to the SMRF 410 using the TDM distribution register TDM_MAP 415. Certain virtual channels convey TDM data streams having "null" symbols. The null analyzer 416 processes the "null" symbols in such a way that they cannot be interpreted by the TDM bus manager 414 as application data. Since the "null" symbols have been inserted by the null inserter 418, they should not be communicated to the receiver (or consumer) application. The corresponding read-allocated virtual channel is then left empty. The "null" symbols are used to ensure that a same quantity of data is sent by the generic node 400 at each network cycle, i.e. the MAC frame which it generates has a fixed size from one network cycle to another, whatever the bit rate of the transmitter (or generator) application. Furthermore, the receiver (or consumer) application retrieves the data at the frequency Fs_OUT which corresponds to the frequency Fs_IN used by the transmitter (or generator) application to clock the transmission (or generation) of the data as described here above. The "null" symbols are not transmitted to the receiver (or consumer) application so that it no longer receives data that this transmitter application had sent and thus prevents any time lag in the reception of data and prevent the overflow of the SSRF FIFO 407. The "null" symbols thus ensure that a piece of data would be presented in the same virtual channel as the one that had been used on the transmit node, a certain number of TDM cycles earlier, to send out this same piece of data.

At each TDM cycle, a MAC adapter 428 included in the "MAC" adaptation module 402b obtains data coming from the write-allocated virtual channels, through the SyncTF_to_MAC FIFO 419.

Then it arranges the data coming from the write-allocated virtual channels in chunks.

Once built, these chunks are transmitted to an encoding module 424 in the form of MAC frames upon reception of a signal referenced Tx_cycle_event 451 (indicating the start of the access time slot of the generic node 400) delivered by the MAC controller 420. These chunks then constitute the payload data 309 of the MAC frame sent by the generic node 400.

In parallel, the encoding module 424 assigns predefined values to the fields SF_id 310 (fixed for all the nodes in a same network cycle), HOP_id 311 (fixed for each node, whatever the network cycle, according to a predetermined transmit or medium access sequence), NODE_id 312 (fixed for each node whatever the network cycle) and SYNCHRO_CPT 317 (variable for each node, according to the steps 605 and 606 of FIG. 6 described here below) once the signal Tx_cycle_event 451 is active.

Then an FEC (<<Forward Error Correction>>) type correction can be made on the MAC frame by the encoding module 424 before the MAC frame is sent to a MAC frame modulator 425.

Reciprocally, once a MAC frame is received by a MAC frame demodulator 422, it is sent to a MAC frame decoder 423 which can implement a FEC type correction.

If the header of the MAC frame is correct, a copy referenced HOP_frame_Rx Hop_id of the HOP_id field 311 and a copy referenced HOP_frame_Rx_Synchro_cpt 454.3 of the SYNCHRO_CPT field 317 of the MAC header 308 are sent to the MAC controller 420 at the same time as a signal referenced HOP_frame_Rx_event is activated. This signal indicates the reception of a new MAC frame and is used for the synchronization of the access control.

In parallel, a copy referenced HOP_frame_Rx_event of the SF_id field 310 and a copy referenced HOP_frame_Rx_Node_id of the NODE_id field 312 of the MAC header 308 are sent to the MAC adapter 428 which reads the data blocks of the payload data field 309 of the MAC frame delivered by the MAC frame decoder 423 and stores them in a memory.

The MAC adapter 428 receives the data coming from the MAC frame decoder 423 in chunk form. The MAC adapter module 428 extracts therefrom the payload data to be injected into the SyncRF_from_MAC FIFO 417 in keeping to the order in which the pieces of data must be presented in the bus 435, TDM cycle after TDM cycle.

The MAC controller 420 is responsible for implementing the MAC synchronization process both to determine the starts of access time slots (the generation of the signal Tx_cycle_event 451) and to generate the signal representing the network cycle starts for the slave nodes (signal SF_slave_cycle). The signal Tx_cycle_event indicates the instant from which the node can transmit via the network, according to the computation or detection of the start of access time slot of the node sending the previous MAC frame, to which a waiting time interval is added to enable the reorientation of the antennas and compensate for the jitter inherent in the wireless network 101. It must be noted that, in the case of the master node, the generation of the signal representing the network cycle starts is the signal SF_master_cycle and that it is generated by the TDM bus manager 414.

The MAC controller 420 also checks the orientation of the antenna 112 in reception by means of a signal Antenna_Ctrl. It is considered to be the case here, in a particular mode of implementation of the meshed network 101, that the nodes orient their radio antennas in reception and use their antenna in omnidirectional mode in transmission, in order to make sure that all the nodes receive the information broadcast by the transmitter node while at the same time limiting the power needed for the transmission of the radio signal.

An RF (radiofrequency) transmit module 434 performs the usual functions of a radio transmitter: conversion of the intermediate frequency at output of the modulator 425 into the frequency of the carrier used by the radio transmissions (conversion into high frequency), amplification, sending through an antenna etc.

An RF (radiofrequency) receive module 434 performs the usual functions of a radio receiver: reception via an antenna, filtering, detection of level, automatic gain control, conversion into low frequency, etc.

FIG. 4 presents an example of architecture of the MAC controller 420 according to a particular embodiment of the invention.

As already indicated, the MAC controller 420 receives four signals at input:
- a signal referenced SF_master_cycle 453 generated by the TDM bus manager 414; and
- three signals generated by the MAC frame decoder 423:
    - The signal referenced HOP_frame_Rx_event 454.1. This signal is generated whenever a MAC frame header is received;
    - The signal referenced HOP_frame_Rx_hop_id 454.2. This signal is the copy of the field HOP_id 311 of the MAC header 308; and
    - The signal referenced HOP_frame_Rx_Synchro_cpt 454.3. This signal is the copy of the field SYNCHRO_CPT 317 of the MAC header 308.

As illustrated in FIG. 4, the MAC controller for 20 outputs three signals:

- A signal referenced SF_slave_cycle 452 designed to be sent to the TDM bus manager 414; and
- Two signals to be sent to the encoding module 424:
  - The signal referenced Tx_cycle_event 451.1. This signal is generated whenever a MAC frame has to be sent to the physical layer; and
  - The signal referenced Tx_cycle_Synchro_cpt 451.2. This signal corresponds to the synchronization information described here above with reference to FIG. 2 which is inserted in the SYNCHRO_CPT field 317 of the MAC header 308 by the encoding module 424.

The MAC controller 420 has two distinct processing modules:

- A first access time slot processing module 460 which is in charge of determining starts of access time slots;
- A second network cycle processing module 461, which is in charge of generating the signal representing the network cycle starts for the slave nodes.

The MAC controller 420 further comprises seven configuration registers designed to co-operate with the first processing module 460 and the second processing module 461:

- A first "Nb_hop" register 463 in which the number of frames forming the super-frame is stored;
- A second "Max_sync_cpt" register 464 in which a value representing the maximum number of intermediate nodes (in the sense of the synchronization) possible between a slave node and the master node (in other words, the master node is shadowed from the slave node) when the master node is still present in the synchronization sequence. An intermediate node (in the sense of the synchronization) is a node that is a slave node (and not the master node) and with whose frame another slave node gets synchronized. When the number of intermediate nodes in the synchronization sequence to which the slave node considered belongs is greater than the value contained in the register "Max_sync_cpt", then it means that the master node is no longer present in the synchronization chain;
- A third register "HOP_duration" 465 in which the duration of the frame is stored. This duration is defined in terms of number of reference clock periods.
- A fourth "Rx_offset" register 466 in which there is stored the time passed, for each transmitted frame, between the reception of a preamble coming from the MAC frame demodulator 422 and the reception of the MAC header 308 for the MAC frame decoder 423;
- A fifth "master/slave" register 467 in which the data for setting the node (master or slave) are stored;
- A sixth "transmit sequence" register 468 in which the sequence of access to the medium by each of the nodes is stored; and
- A seventh "Max_SF" register 469 storing the maximum number of times for which a node is authorized to access the medium without getting synchronized or resynchronized with another node.

FIG. 5a presents the main steps of a processing algorithm implemented by the MAC controller 420 (described with reference to FIG. 3), included in the master node (of the wireless meshed network 101), according to a particular embodiment of the invention.

After the start-up of the master node (step 500), there is a wait in a step 501 for signal (also called an event) SF_master_cycle 453 indicating the start of a new network cycle. As indicated here above (with reference to FIG. 3), the SF_master_cycle signal 453 is generated by the TDM bus manager 414.

In a step 502, the SF_master_cycle signal 453 is received.

In a step 503, information on synchronization Tx_cycle_Synchro_cpt 451.2 is set with the value "0".

Then, in a step 504, a signal Tx_cycle_event 451.1 is transmitted to the encoding module 424 (included in the master node). Then, the operation returns to the step 501. It may be recalled that containers or chunks (containing data sent in the virtual channels of consecutive TDM cycles and repetition data) are sent to the encoding module 424 in the form of MAC frames at the reception of the signal Tx_cycle_event.

Referring now to FIG. 5b, a description is provided of the main steps of a processing algorithm implemented by the encoding module 424 (described with reference to FIG. 3) and included in the generic node (master or slave), according to a particular embodiment of the invention.

After the start-up of the node (step 505), there is a wait in a step 510 for a Tx_cycle_event signal 451.1 generated by the MAC controller 420.

In a step 511, the Tx_cycle_event signal 451.1 is received.

Then, in a step 512, the SYNCHRO_CPT field 317 of the MAC header 308 is set with the synchronization information Tx_cycle_Synchro_cpt 451.2 and predefined values are assigned to the other three fields (SF_id 310, HOP_id 311 and NODE_id 312) of the MAC header 308. The SF_id 310 field identifies the super-frame, i.e. the network cycle in which the frame to be transmitted by the given generic node is situated. The HOP_id 311 and NODE_id fields 312 are dependent on the given generic node. Then, the operation returns to the step 510.

Referring to FIG. 5c, we present the main steps of a processing algorithm implemented by the MAC frame decoder 423 (described with reference to FIG. 3), included in the genetic node (master or slave), according to a particular embodiment of the invention.

After start-up of the node (step 506), there is a wait in a step 520 for reception of a preamble (notified by an "Rx_preamble" event) of a new MAC frame generated by the MAC frame demodulator 422.

In a step 521, the "Rx_preamble" event notifying the reception of a preamble (indication of received frame) is received.

In a step 522, a copy "HOP_frame_Rx_Hop_id" 454.2 of the HOP_id field 311 of the MAC header 308 of the received frame is sent to the MAC controller 420.

In a step 523, a copy "HOP_frame_Rx_Synchro_cpt" 454.3 of the SYNCHRO_CPT 317 field of the MAC header 308 of the received frame is sent to the MAC controller 420.

Then, in a step 524, a "HOP_frame_Rx_event" signal 454.1, indicating the reception of a new MAC header is sent to the MAC controller 420. Then, the operation returns to the step 520.

Referring to FIG. 6, we present the main steps of a processing algorithm implemented by the MAC controller 420 (described with reference to FIG. 3) included in the slave node (of the wireless meshed network 101), according to a particular embodiment of the invention.

After the start-up of the slave node (step 600), at the step 601, a variable <<Min_sync_cpt>> is set with a value is stored in the register <<Max_sync_cpt>> 464 (described with reference to FIG. 4).

In a step 602, there is a wait for the transmission of a signal Tx_cycle_event 451.1 to the encoding module 424 or the reception of a "HOP_frame_Rx_event" signal 454.1 generated by the MAC frame decoder 423.

In a step 6021, the "HOP_frame_Rx_event" signal 454.1 notifying reception of a frame coming from the network is received.

In a step 6023, a check is made to see if the master node is still present in the synchronization chain to which the node having sent the received frame belongs. Thus, the synchronization information contained in the SYNCHRO_CPT field 317 is compared with a maximum value, contained in the "Max_sync_cpt" register 464, this maximum value representing a maximum number of intermediate nodes in the sense of the synchronization, beyond which it is detected that the master node is no longer present in the synchronization chain. Beyond this value, the slave node is not authorized to access the medium in using the node that has sent the received frame as a reference node, for the situation no longer prevents transmission collisions in the wireless communications network. As indicated here above, a slave node can detect the absence of the master node in a synchronization chain in detecting a continual increase of the counter represented by the SYNCHRO_CPT field 317, as and when the frames and the transmission cycles occur in the communications network.

Thus, in a step 603, a test is conducted, for example, to see if the value of the variable HOP_frame_Rx_Synchro_cpt (which is the copy of the SYNCHRO_CPT field 317 of the MAC header 308 of the received frame) is greater than the value stored in the "Max_sync_cpt" register 464. If the response is affirmative, the received MAC frame is not kept as being a synchronizing frame, and the operation goes to the step 604.

In the step 604, a test is conducted to see if the value of the variable HOP_frame_Rx_Synchro_cpt is lower than or equal to the value of the variable Min_sync_cpt, obtained at the steps 601. If the response is affirmative, it means that the slave node can get synchronized with another reference node that would enable it to be better synchronized with a master node, and the operation goes to a step 605. If the response is negative, the operation returns to the step 602.

In the step 605, the variable Min_sync_cpt is updated with the value of the variable HOP_frame_Rx_Synchro_cpt of the step 604.

In a step 606, a request is generated for determining a new access time slot instant. In other words, the determining of a new start of access time slot is triggered.

Then, in a step 607, a request is generated for determining a new network cycle. In other words, the determining of the next position of the super-frame is triggered. Then, the operation returns to the step 602.

In a step 6022, the Tx_cycle_event signal 451.1 is transmitted.

Then, in a step 608, the synchronization information Tx_cycle_Synchro_cpt 451.2 is set with the value of the variable Min_sync_cpt, obtained at the step 605, incremented by one unit, so as to indicate one intermediate node more than the synchronization information provided by the reference node. Thus, the frame used to obtain the best possible synchronization has been identified. Then, the operation returns to the step 601.

In one variant of the particular embodiment of the invention, as already mentioned, the synchronization information contained in the SYNCHRO_CPT field 317 is a piece of resynchronization drift information. The slave node then adds its own resynchronization drift information to the resynchronization drift information provided by the reference node in the SYNCHRO_CPT field 317 of its frame. The drifts are thus cumulated (signed values), the drift for a slave node corresponding to the difference between an estimated instant of reception of the synchronizing frame (the received frame from which the slave node considered gets synchronized) and the effective instant of reception of this frame. Thus, for the performance of the above-mentioned steps 6023 and 603, the synchronization information contained in the SYNCHRO_CPT field 317 is compared with a maximum value contained in a register that can be likened to the "Max_sync_cpt" register 464, this maximum value representing a maximum cumulated drift beyond which it is detected that the master node is no longer present in the synchronization chain. Beyond this value, the slave node is not authorized to access the medium in using the node that has sent the received frame as a reference frame for the situation no longer prevents transmission collisions in the wireless communications network. As indicated here above, a slave node can detect the absence of the master node in a synchronization chain in detecting a continual increase in the resynchronization drift as and when the frames and the transmission cycles occur in the communications network.

Referring to FIG. 7, we present an example of an architecture of the access time slot processing module 460 according to a particular embodiment of the invention. As already indicated, the access time slot processing module 460 of the MAC controller 420 generates the Tx_cycle_event signal indicating the start of the access time slot of the node in the transmission cycle in the medium.

The access time slot processing module 460 comprises:

A first counter 720 which delivers at output "Out1" an output signal 706 representing a duration, expressed in clock periods, that is used to trigger the end of the access time slots of the nodes. More specifically, at a first input "Reset1", the first counter 720 receives a reset signal "Reset1" 701, at a second input "Clock ENA1", a control signal "CENa1" 702, at a third input "Clock1", a clock signal "Clk" 703, at a fourth input "Load" a load signal "Load1" 704 and at a fifth input "Din", "Rx_offset" data coming from the register "Rx_offset" 466 (cf. FIG. 4). Thus, when a request for determining a new access time slot is received, the control signal "CENa1" 702 and the load signal "Load1" 704 are active so as to permit the first counter 720 to get loaded with the data "Rx_offset" coming from the register "Rx_offset" 466. In other words, the first counter gets loaded with the time that has passed, for each frame sent between the reception of the preamble coming from the MAC frame demodulator 422 and the reception of the MAC header 308 by the MAC frame decoder 423;

A first comparator 708 receiving the output signal 706 at a first input and, at a second input, a signal representing a frame duration (expressed in clock periods) stored in the "HOP_duration" register 465. The first comparator 708 outputs a resultant signal 740 corresponding to the result of the subtraction between the output signal 706 and the signal coming from the "HOP_duration" register 465;

A second counter 700 which delivers an output signal 709, representing a number of frames, at output "Out2". More specifically, at a first input "Reset2", the second counter 700 receives the reset signal "Reset1" 701, at a second input "Clock ENA2", the control signal "CENa1" 702, and at a third input "Clock2", the resulting signal 740; and A second comparator 710 receiving the output signal 709 at a first input and, at a second input, a signal 711 comprising a variable Nb_hop_before_Tx corresponding to the number of frames in the super-frame which is counted between the next frame to be transmitted and the received frame that is at the origin of the request for determining a new access time slot. The second comparator 710 outputs the signal Tx_cycle_event indicating the start of the next access time slot of the node for the current transmission cycle for the next network transmission cycle as a function of the relative positions of the synchronizing frame (identified by its HOP_id field) and that of the frame of the slave node considered (identified by a variable My_HOP_id described here below).

Referring to FIG. 8, we present the main steps of an algorithm for the management of the counters 720 and 700 described here above with reference to FIG. 7, according to a particular embodiment of the invention.

After the start-up of the node (step 800), there is a wait in a step 801 for a Tx_cycle_event signal 451.1 generated by the MAC controller 420 or a request for determining a new start of access time slot generated at the step 606 (cf. FIG. 6).

In a step 8010, a request is received for determining a new start of access time slot.

In a step 803, a test is performed to find out if the position (in the frame transmission sequence in a transmission cycle) of the node that sends the MAC frame contained in the variable HOP_frame_Rx_Hop_id, is greater than the position (in the super-frame) of the slave node, contained in a variable My_Hop_id containing the frame identifier of the slave node considered (used to fill the HOP_id field 311 of the frame transmitted by the slave node considered). If the response is affirmative, the operation goes to a step 804. If, on the other hand, the response is negative, the operation passes to a step 809. It can be noted that this step 803 is used to manage the modulo value of the size of the super-frame. In other words, if the variable HOP_frame_Rx_Hop_id is greater than the variable My_Hop_id, then the slave node will speak to the next super-frame. If, on the contrary, the variable HOP_frame_Rx_Hop_id is lower than or equal to the variable My_Hop_id, then the slave node will speak to the same super-frame as that of the node that sends the MAC frame.

In the step 804, the next variable Nb_hop_before_Tx is computed according to a computation formula defined by:

$$Nb\_hop\_before\_Tx = My\_Hop\_id + (Nb\_hop - HOP\_frame\_Rx\_Hop\_id)$$

where

Nb_hop_before_Tx corresponds to the number of frames in the super-frame that is counted between the next frame to be transmitted by the slave node considered and the received frame, that is at the origin of the request for determining a new start of access time slot;

My_Hop_id identifies the frame, i.e. the position (in the super-frame) of the frame transmitted (or to be transmitted) by the slave node considered;

Nb_hop corresponds to the number of frames forming the super-frame; and

HOP_frame_Rx_Hop_id corresponds to the position (in the super-frame) of the frame that is received and is at the origin of the determining of a new start of access time slot.

After the step 804, the operation passes to a step 805.

In the step 809, the variable Nb_hop_before_Tx is computed according to a computation formula defined by:

$$Nb\_hop\_before\_Tx = My\_Hop\_id - HOP\_frame\_Rx\_Hop\_id$$

where

Nb_hop_before_Tx corresponds to the number of frames in the super-frame that is counted between the next frame to be transmitted by the slave node considered and the received frame, that is at the origin of the request for determining a new start of access time slot;

My_Hop_id identifies the frame, i.e. the position (in the super-frame) of the frame transmitted (or to be transmitted) by the slave node considered; and HOP_frame_Rx_Hop_id identifies the frame, i.e. the position (in the super-frame) of the frame that is received and is at the origin of the determining of a new start of access time slot.

After the step 809, the operation passes to the step 805.

At the step 805, a variable Nb_SF_without_synchro, is set at zero owing to the fact that a MAC frame, through which a slave node was able to get synchronized or resynchronized, has been received.

In a step 806, the load signal Load1 704 is activated (i.e. the counter 720 is loaded with the data Rx_offset).

In a step 807, the reset signal Reset1 701 is activated (i.e. the counter 720 is reset).

Then, in a step 808, the control signal CENa1 702 is activated so as to authorize the counters 720 and 700 to count (starting with the value of the data Rx_offset). Then, the operation returns to the step 801.

In a step 8012, the signal Tx_cycle_event 451.1 is received.

In a step 810, an incrementation by one unit is applied to the variable Nb_SF_without_synchro, which identifies the number of super-frames that have elapsed without the slave node having succeeded in receiving a frame from the network, through which the slave node has been capable of getting synchronized or re-synchronized.

In a step 811, a test is made to see if the number of super-frames contained in the variable Nb_SF_without_synchro is lower than the number of super-frames contained in the variable Max_SF (stored in the register 469). If the response is affirmative, the operation passes to a step 814. If, on the contrary, the response is negative, the operation passes to a step 812.

It can be noted that this comparison is aimed at checking on whether or not the operation has reached the number of transmission cycles permitted without reception from the network of a frame by which the slave node had be able to get synchronized or re-synchronized. In the event of positive verification, the slave node is prohibited from accessing the medium.

In the step 812, the reset signal Reset1 701 is activated (i.e. the signal Reset1 takes the logic value "1").

Then, in a step 813, the control signal CENa1 702 is deactivated (i.e. the signal CENa1 takes the logic value "0") to prohibit the slave node considered from accessing the medium. Then, the operation returns to the step 801.

In the step 814, the variable Nb_hop_before_Tx is set with the number of frames Nb_hop forming the super-frame (the next frame transmission by the slave node considered will be done after a duration of one super-frame, the duration of the super-frame being likened to the duration of the transmission cycle), recorded in the register 463. Then, the operation passes to the step 807.

Referring to FIG. 9, we present an example of an architecture of the network cycle (or transmission cycle) processing module 461 according to a particular embodiment of the invention. As already indicated, the network cycle processing module 461 generates the SF_slave_cycle signal 452 indicating the start of the network cycle (or transmission cycle).

The network cycle processing module 461 comprises:

A first counter 920 which delivers at output "Out3" an output signal 906 representing a duration expressed in clock periods, that is used to trigger the end of the access time slots of the nodes. More specifically, at a first input "Reset3", the first counter 920 receives a reset signal "Reset2" 901, at a second input "Clock ENA3", a control signal "CENa2" 902, at a third input "Clock3", a clock signal "Clk" 903, at a fourth input "Load" a load signal "Load2" 904 and at a fifth input "Din", "Rx_offset" data coming from the "Rx_offset" register 466 (cf. FIG. 4). Thus, when a request for determining a new start of a network cycle is received, the control signal "CENa2" 902 and the load signal "Load2" 904 are active so as to permit the first counter 920 to get loaded with the data "Rx_offset" coming from the "Rx_offset" register 466. In other words, the first counter gets loaded with the value of the time passed, for each frame sent between the reception of the preamble coming from the MAC frame demodulator 422 and the reception of the MAC header 308 by the MAC frame decoder 423;

A first comparator 908 receiving the output signal 906 at a first input and, at a second input, a signal representing a frame duration (expressed in clock periods) stored in the "HOP_duration" register 465. The first comparator 908 outputs a resultant signal 940 corresponding to the result of the subtraction between the output signal 006 and the signal coming from the "HOP_duration" register 465;

A second counter 900 which delivers an output signal 909, representing a number of frames, at output "Out4". More specifically, at a first input "Reset4", the second counter 900 receives the reset signal "Reset2" 901, at a second input "Clock ENA4", the control signal "CENa2" 902, and at a third input "Clock4", the resulting signal 940; and A second comparator 905 receiving the output signal 909 at a first input and, at a second input, a signal 906 comprising a variable Nb_hop_before_SF corresponding to the number of frames in the super-frame which is counted between the first frame of the super-frame (i.e. the frame of the master node) and the received frame or, by default, the sent frame that is at the origin of the request for determining a new network cycle. The second comparator 905 outputs the signal SF_slave_cycle indicating the start of the network cycle.

Referring to FIG. 10, we present the main steps of an algorithm for the management of the counters 920 and 900 described here above with reference to FIG. 9, according to a particular embodiment of the invention.

After the start-up of the node (step 1000), there is a wait in a step 1001 for an SF_slave_cycle_signal 452 generated by the MAC controller 420 or a request for determining a new network cycle generated at the step 607 (cf. FIG. 6).

In a step 10011, a request is received for determining a new network cycle.

In a step 1003, a variable Nb_hop_before_SF is computed according to a computation formula defined by:

$$Nb\_hop\_before\_SF = Nb\_hop\_HOP\_frame\_Rx\_Hop\_id$$

where
Nb_hop_before_SF corresponds to the number of frames in the super-frame that is counted between the received frame that is at the origin of the request for determining a new network cycle and the next first frame of the super-frame (i.e. the frame of the master node), i.e. the start of the next network cycle (or transmission cycle);
Nb_hop corresponds to the number of frames forming the super-frame; and
HOP_frame_Rx_Hop_id corresponds to the position (in the super-frame) of the frame that is received and is at the origin of the determining of a new start of network cycle.

In a step 1004, a variable Nb_SF_without_synchro, is set at zero owing to the fact that a MAC frame, through which a slave node was able to get synchronized or resynchronized, has been received.

In a step 1005, the load signal Load2 904 is activated (i.e. the counter 920 is loaded with the data Rx_offset).

In a step 1006, the reset signal Reset2 901 is activated (i.e. the counter 920 is reset).

Then, in a step 1007, the control signal CENa2 902 is activated so as to authorize the counters 920 and 900 to count (starting with the value of the data Rx_offset). Then, the operation returns to the step 1001.

In a step 10012, the signal SF_slave_cycle 452 is received.

In a step 1008, the variable Nb_SF_without_synchro is incremented by one unit.

In a step 1009, a test is made to see if the number of super-frames contained in the variable Nb_SF_without_synchro is lower than the number of super-frames contained in the variable Max_SF (stored in the register 469). If the response is affirmative, the operation passes to a step 1102. If, on the contrary, the response is negative, the operation passes to a step 1010.

It can be noted that this comparison is aimed at checking on whether or not the operation has reached the number of transmission cycles permitted without reception from the network of a frame by which the slave node had be able to get synchronized or re-synchronized. In the event of positive verification, the slave node is prohibited from accessing the medium.

In the step 1010, the reset signal Reset2 901 is activated (i.e. the signal Reset2 takes the logic value "1").

Then, in a step 1011, the control signal CENa2 902 is deactivated (i.e. the signal CENa2 takes the logic value "0") to prohibit the slave node considered from accessing the medium. Then, the operation returns to the step 1001.

In the step 1012, the variable Nb_hop_before_SF is set with the number of frames Nb_hop forming the super-frame, recorded in the register 463. Then the operation returns to the step 1006.

The invention claimed is:

1. A method for accessing a medium by a transmit node in a synchronous communications network comprising a plurality of nodes capable of accessing said medium during access time slots of predetermined duration to transmit data frames via said network, said plurality of nodes comprising a master node that implements a clocking that defines a network cycle for accessing said medium and comprising at least two slave nodes being slaves of said clocking including said transmit node, each network cycle comprising a plurality of frames transmitted during said access time slots according to a predetermined transmission sequence, wherein the transmit node performs indirect synchronization with the master node for accessing said medium, the indirect synchronization comprising:

receiving at least one frame coming from at least one of the other slave nodes of the network;

from each frame received, obtaining synchronization information pertaining to a level of synchronization of the other slave node having sent said frame, said level of synchronization of the other slave node being relative to the master node;

selecting a reference node from among the at least one of the other slave nodes from which at least one frame has been received, as a function of said synchronization information, the transmit node being indirectly synchronized with the master node via the reference node;

determining a start of access time slot from the positions in said transmission sequence of the frames associated with the reference node and with said transmit node; and accessing said medium at said determined start of access time slot.

2. The method according to claim 1, wherein the step of selecting a reference node comprises a step of verifying, from the synchronization information, that at least one node from among the slave node(s) from which at least one frame has been received is/are synchronized with the master node, a given slave node being synchronized with the master node if it fulfils one of the following conditions:

the master node is the reference node of said given slave node;

the reference node of said given slave node is synchronized with the master node.

3. The method according to claim 2, wherein the step of verifying, on the basis of the synchronization information, that at least one node from among the other slave nodes from which at least one frame has been received is synchronized with the master node, comprises a step of verifying that the synchronization information is stable over consecutive network cycles.

4. The method according to claim 2, wherein said reference node is selected from among the other slave nodes whose frames contain synchronization information below a first threshold, said first threshold being defined as a function of the number of nodes present in the network.

5. The method according to claim 1, wherein the synchronization information contained in a frame received from a given slave node is equal to the synchronization information contained in a frame coming from a node that said given slave node has selected as a reference node incremented by one unit.

6. The method according to claim 1, wherein the synchronization information contained in a frame coming from a given slave node corresponds to a resynchronization drift of said given slave node relative to the master node, said drift being equal to a resynchronization drift of said given slave node relative to its reference node to which there is added a resynchronization drift of said reference node relative to the master node, a resynchronization drift of a slave node corresponding to a difference between an instant estimated by said slave node of reception of a frame and an effective instant of reception of this frame.

7. The method according to claim 1, wherein, for each network cycle, said obtaining and selecting steps are performed after each reception of a new frame, said step of determining a start of access time slot is performed after each selecting step during which a new reference node is selected, at each new execution of said determining step, a timeout mechanism is activated with a timeout duration that is a function of the positions, in said transmission sequence, of the frames associated with said new reference node and with said slave node, said timeout duration elapsing indicates said start of access time slot if said timeout mechanism is not activated again during said timeout duration.

8. The method according to claim 1, wherein, for a given network cycle, if no new reference node whatsoever can be selected during said selecting step, the transmit node performs the following steps:

incrementing by one unit a counter of network cycles without resynchronization;

if the value of said counter for said given network cycle is smaller than or equal to a second threshold, said start of access time slot corresponding to an instant of elapsing of a timeout that has a duration equal to the duration of a network cycle and that is activated at the start of the access time slot, of said transmit node, of the network cycle preceding said given network cycle.

9. A non-transitory computer-readable storage medium, storing a computer program comprising a set of instructions executable by a computer in order to implement a method for accessing a medium by a transmit node in a synchronous communications network comprising a plurality of nodes capable of accessing said medium during access time slots of predetermined duration to transmit data frames via said network, said plurality of nodes comprising a master node that implements a clocking that defines a network cycle for accessing said medium and comprising at least two slave nodes being slaves of said clocking including said transmit node, each network cycle comprising a plurality of frames transmitted during said access time slots according to a predetermined transmission sequence, wherein the transmit node performs indirect synchronization with the master node for accessing said medium, the indirect synchronization comprising:

receiving at least one frame coming from at least one of the other slave nodes of the network;

from each frame received, obtaining synchronization information pertaining to a level of synchronization of the other slave node having sent said frame, said level of synchronization of the other slave node being relative to the master node;

selecting a reference node from among the at least one of the other slave nodes from which at least one frame has been received, as a function of said synchronization information, the transmit node being indirectly synchronized with the master node via the reference node;

determining a start of access time slot from the positions in said transmission sequence of the frames associated with the reference node and with said transmit node; and accessing said medium at said determined start of access time slot.

10. A transmit node comprising means for accessing a medium in a synchronous communications network, said network comprising a plurality of nodes capable of accessing said medium during access time slots of predetermined duration to transmit data frames via said network, said plurality of nodes comprising a master node that implements a clocking that defines a network cycle for accessing said medium and comprising at least two slave nodes being slaves of said clocking including said transmit node, each network cycle comprising a plurality of frames transmitted during said access time slots according to a predetermined transmission sequence, wherein the transmit node performs indirect synchronization with the master node for accessing said medium, and wherein the transmit node comprises:

means for receiving at least one frame coming from at least one of the other slave nodes of the network;

from each frame received, means for obtaining synchronization information pertaining to a level of synchronization of the other slave node having sent said frame, said level of synchronization of the other slave node being relative to the master node;

means for selecting a reference node from among the at least one of the other slave nodes from which at least one frame has been received as a function of said pieces of synchronization information, the transmit node being indirectly synchronized with the master node via the reference node;

means for determining a start of access time slot from the positions in said transmission sequence of the frames associated with the reference node and with said transmit node.

11. The transmit node according to claim 10, wherein said means for selecting a reference node comprise first means for verifying, from the synchronization information, that at least one node from among the other slave node(s) from which at least one frame has been received is/are synchronized with the master node.

12. The transmit node according to claim 11, wherein said first means for verifying comprise second means for verifying that the synchronization information is stable over consecutive network cycles.

13. The transmit node according to claim 11, wherein said means for selecting a reference node comprise means for comparing a piece of synchronization information with a first threshold, said selection means selecting said reference node from among the other slave nodes whose frames contain a piece of synchronization information below said first threshold, said first threshold being defined as a function of the number of nodes present in the network.

14. The transmit node according to claim 10, wherein the synchronization information contained in a frame received from a given slave node is equal to the synchronization information contained in a frame coming from a node that said given slave node has selected as a reference node incremented by one unit.

15. The transmit node according to claim 10, wherein the synchronization information contained in a frame coming from a given slave node corresponds to a resynchronization drift of said given slave node relative to the master node, said drift being equal to a resynchronization drift of said given slave node relative to its reference node to which there is added a resynchronization drift of said reference node relative to the master node, a resynchronization drift of a slave node corresponding to a difference between an instant estimated by said slave node of reception of a frame and an effective instant of reception of this frame.

16. The transmit node according to claim 10, wherein said reading and selection means are activated after each reception of a new frame, said means for determining a start of access time slot are activated after each activation of said selection means, and the transmit node further comprises timeout means, said timeout means being activated after each new activation of said means for determining a start of access time slot, said timeout means comprising a timeout duration that is a function, of the positions, in said transmission sequence, of the frames associated with said new reference node and with said slave node, the end of the passage of said timeout duration indicating said start of access time slot if said timeout means are not activated again during said timeout duration.

17. The transmit node according to claim 10, wherein it comprises means for incrementing by one unit a counter of network cycles without resynchronization, and if the value of said counter for said given network cycle is smaller than or equal to a second threshold, said start of access time slot corresponding to an instant of elapsing of a timeout that has a duration equal to the duration of a network cycle and that is activated at the start of the access time slot, of said transmit node, of the network cycle preceding said given network cycle.

18. A method for accessing a medium by a transmit node in a synchronous communications network comprising a plurality of nodes capable of accessing said medium during access time slots of predetermined duration to transmit data frames via said network, said plurality of nodes comprising a master node that implements a clocking that defines a network cycle for accessing said medium and comprising at least two slave nodes being slaves of said clocking including said transmit node, each network cycle comprising a plurality of frames transmitted during said access time slots according to a predetermined transmission sequence, wherein the transmit node performs the following steps:

receiving at least one frame coming from at least one of the other nodes of the network;

from each frame received, obtaining synchronization information, wherein the synchronization information contains at least one of the following information elements: drift information of the other node having sent said frame relative to the master node, and counter information pertaining to a number of intermediate nodes between the other node having sent said frame and the master node;

selecting a reference node from among the at least one of the other nodes from which at least one frame has been received, as a function of said synchronization information;

determining a start of access time slot from the positions in said transmission sequence of the frames associated with the reference node and with said transmit node; and accessing said medium at said determined start of access time slot.

* * * * *